(12) United States Patent
Song et al.

(10) Patent No.: US 10,582,287 B2
(45) Date of Patent: Mar. 3, 2020

(54) ELECTRONIC DEVICE INCLUDING COVER HAVING OPEN/CLOSE STRUCTURE USING MAGNETIC FORCE

(71) Applicant: Samsung Electronics Co., Ltd., Suwon-si, Gyeonggi-do (KR)

(72) Inventors: Hyun-Do Song, Yongin-si (KR); Kwon-Ho Son, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/107,341

(22) Filed: Aug. 21, 2018

(65) Prior Publication Data

US 2019/0069066 A1 Feb. 28, 2019

(30) Foreign Application Priority Data

Aug. 22, 2017 (KR) .................. 10-2017-0106101

(51) Int. Cl.
*H04R 1/10* (2006.01)
*H01F 7/02* (2006.01)
(Continued)

(52) U.S. Cl.
CPC ....... *H04R 1/1025* (2013.01); *E05B 17/0033* (2013.01); *E05C 1/10* (2013.01);
(Continued)

(58) Field of Classification Search
CPC .. H04R 1/1025; H04R 1/1016; H04R 1/1041; H04R 2420/07; H01F 7/02; H01F 7/04;
(Continued)

(56) References Cited

U.S. PATENT DOCUMENTS

2006/0006674 A1 1/2006 Kang et al.
2007/0133156 A1 6/2007 Ligtenberg et al.
(Continued)

FOREIGN PATENT DOCUMENTS

| GB | 2 264 975 A | 9/1993 |
|---|---|---|
| KR | 10-2015-0122387 A | 11/2015 |
| WO | 2012/036717 A1 | 3/2012 |

OTHER PUBLICATIONS

European Search Report dated Jan. 25, 2019; Ref. #: P6078384EP; Application #/Patent#: 18190234.7-1210.
International Search Report dated Dec. 4, 2018; International Application #: PCT/KR2018/009581.

*Primary Examiner* — Mark Fischer
(74) *Attorney, Agent, or Firm* — Jefferson IP Law

(57) ABSTRACT

An electronic device including a cover having an open/close structure is provided. The electronic device includes a housing including an upper face and a recess formed through the upper face in order to accommodate an earphone device, a cover for covering the recess in a closed state and to allow access to the recess in an opened state, a conductive pin disposed in the recess and biased mechanically toward the cover in the closed state, a circuit electrically connected to the conductive pin, a plurality of magnets disposed in the cover, a mechanical hook structure coupled to a peripheral portion of the cover in the closed state, and a button, when pressed, for separating the hook structure from the peripheral portion while moving a magnet to a position where the magnet faces another magnet.

17 Claims, 22 Drawing Sheets

(51) Int. Cl.
  *H02J 7/00* (2006.01)
  *E05B 17/00* (2006.01)
  *E05C 19/16* (2006.01)
  *E05C 1/10* (2006.01)

(52) U.S. Cl.
  CPC ............... *E05C 19/16* (2013.01); *H01F 7/02* (2013.01); *H02J 7/0044* (2013.01); *H04R 1/1016* (2013.01); *H04R 1/1041* (2013.01); *H04R 2420/07* (2013.01)

(58) Field of Classification Search
  CPC ........ H02J 7/0044; E05C 19/16; E05C 17/56; G06F 1/1616; G06F 1/1679; Y10T 292/11; Y10T 16/52; E05B 17/0033
  See application file for complete search history.

(56) References Cited

U.S. PATENT DOCUMENTS

| | | | |
|---|---|---|---|
| 2008/0061565 A1* | 3/2008 | Lee | E05C 19/16 292/251.5 |
| 2008/0278269 A1* | 11/2008 | Ramirez | E05C 19/16 335/205 |
| 2008/0309098 A1 | 12/2008 | Hsu et al. | |
| 2011/0031766 A1 | 2/2011 | Huang et al. | |
| 2014/0034080 A1* | 2/2014 | Paquet | H01F 7/04 132/286 |
| 2014/0146458 A1 | 5/2014 | Zhao | |
| 2014/0313665 A1* | 10/2014 | Delpier | G06F 1/1616 361/679.55 |
| 2017/0094391 A1 | 3/2017 | Panecki et al. | |
| 2017/0195770 A1 | 7/2017 | Cheney et al. | |

\* cited by examiner

ELECTRONIC DEVICE INCLUDING COVER HAVING OPEN/CLOSE STRUCTURE USING MAGNETIC FORCE

CROSS-REFERENCE TO RELATED APPLICATION(S)

This application is based on and claims priority under 35 U.S.C. § 119 of a Korean patent application number 10-2017-0106101, filed on Aug. 22, 2017, in the Korean Intellectual Property Office, the disclosure of which is incorporated by reference herein in its entirety.

BACKGROUND

1. Field

The disclosure relates to an electronic device including a cover having an open/close structure using magnetic force.

2. Description of Related Art

The application range of electronic devices is becoming wider, and many users use portable electronic devices because of convenience of carrying. Some of these portable electronic devices may be carried in the state of being stored in separate devices (e.g., a cradle, or a case device) when not in use. The separate devices may have a function of protecting portable electronic devices from the outside, a function of data communication with an external electronic device, and a charging function using an external power source.

The above information is presented as background information only to assist with an understanding of the disclosure. No determination has been made, and no assertion is made, as to whether any of the above might be applicable as prior art with regard to the disclosure.

SUMMARY

An electronic device may be a folder-type electronic device including an openable/closable cover for easy operation when accommodating or separating an external electronic device.

An electronic device, configured to accommodate therein an external electronic device for the purpose of carrying, data communication, or charging, may include a cover openable from/closable to a housing. According to one embodiment, an electronic device may include a housing including an accommodation space for accommodating an external electronic device therein, and a cover installed at one end of the housing to be openable/closable. The cover may have a mechanical opening/closing structure based on a spring or self-elastic structure or a cover closing structure based on at least one magnet member.

However, the mechanical opening/closing structure based on the spring or self-elastic structure may cause malfunction due to wear of components due to frequent closing/opening of the cover. Further, in the structure in which at least a pair of magnets are disposed on the housing and the cover so as to attract each other to induce closing of the cover, when the attracting force is weakened, the cover may not be completely closed due to the repulsive force of a conductive pin included in the housing, and when the attracting force is made strong, the cover may inadvertently and strongly closed, causing a product liability (PL) accident, or the cover may not be opened properly when a release button is pressed.

Aspects of the disclosure are to address at least the above-mentioned problems and/or disadvantages and to provide at least the advantages described below. Accordingly, an aspect of the disclosure is to provide an electronic device including a cover having an opening/closing structure using magnetic force.

Additional aspects will be set forth in part in the description which follows and, in part, will be apparent from the description, or may be learned by practice of the presented embodiments.

In accordance with an aspect of the disclosure, an electronic device is provided. The electronic device includes a housing including an upper face and at least one recess formed through the upper face in order to accommodate at least one earphone device, a cover for covering the at least one recess in a closed state and to allow access to the at least one recess in an opened state, the cover including a first peripheral portion that is connected to a first portion of the housing at one side with respect to the at least one recess and a second peripheral portion that is separably connected to a second portion of the housing at the other side opposite the one side with respect to the at least one recess, at least one conductive pin disposed in the at least one recess, and biased mechanically toward the cover in the closed state, a circuit electrically connected to the at least one conductive pin, a first magnet disposed in the first peripheral portion of the cover and having a first polarity, a second magnet disposed in the housing to face the first magnet in the closed state and having a second polarity which is the same as the first polarity, a third magnet disposed in the second peripheral portion of the cover and having a third polarity, a fourth magnet disposed in the second peripheral portion near the third magnet and having a fourth polarity opposite that of the third polarity, a fifth magnet movably disposed in the housing to face the third magnet in the closed state and having a fifth polarity opposite that of the third polarity, a mechanical hook structure coupled to the second peripheral portion of the cover in the closed state, and a button, when pressed, for separating the hook structure from the second peripheral portion while moving the fifth magnet to a position where the fifth magnet faces the fourth magnet.

In accordance with another aspect of the disclosure, a case device is provided. The case device includes a housing including at least one recess formed through an upper face so as to accommodate at least one external electronic device, a cover hinged by a hinge portion for opening/closing the cover in a portion of the housing, and covering the at least one recess in the closed state, the cover including a first peripheral portion opposite a first portion of the housing near the hinge portion with respect to the at least one recess and a second peripheral portion separably connected to a second portion of the housing at another side opposite the hinge portion, a first magnet disposed on a first periphery of the cover, a second magnet disposed in the housing and disposed to react to a magnetic force of the first magnet in a state where the cover is closed, a third magnet disposed in the second peripheral portion of the cover, a fourth magnet disposed near the third magnet in the second peripheral portion, and a fifth magnet movably disposed in the housing, and wherein the fifth magnet holds the cover in a state of being closed to the housing when disposed so as to generate an attractive force at a position where the fifth magnet reacts to the magnetic force of the third magnet, and opens the cover from the housing when shifted to a position where the fifth magnet reacts to the fourth magnet and generates a repulsive force.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
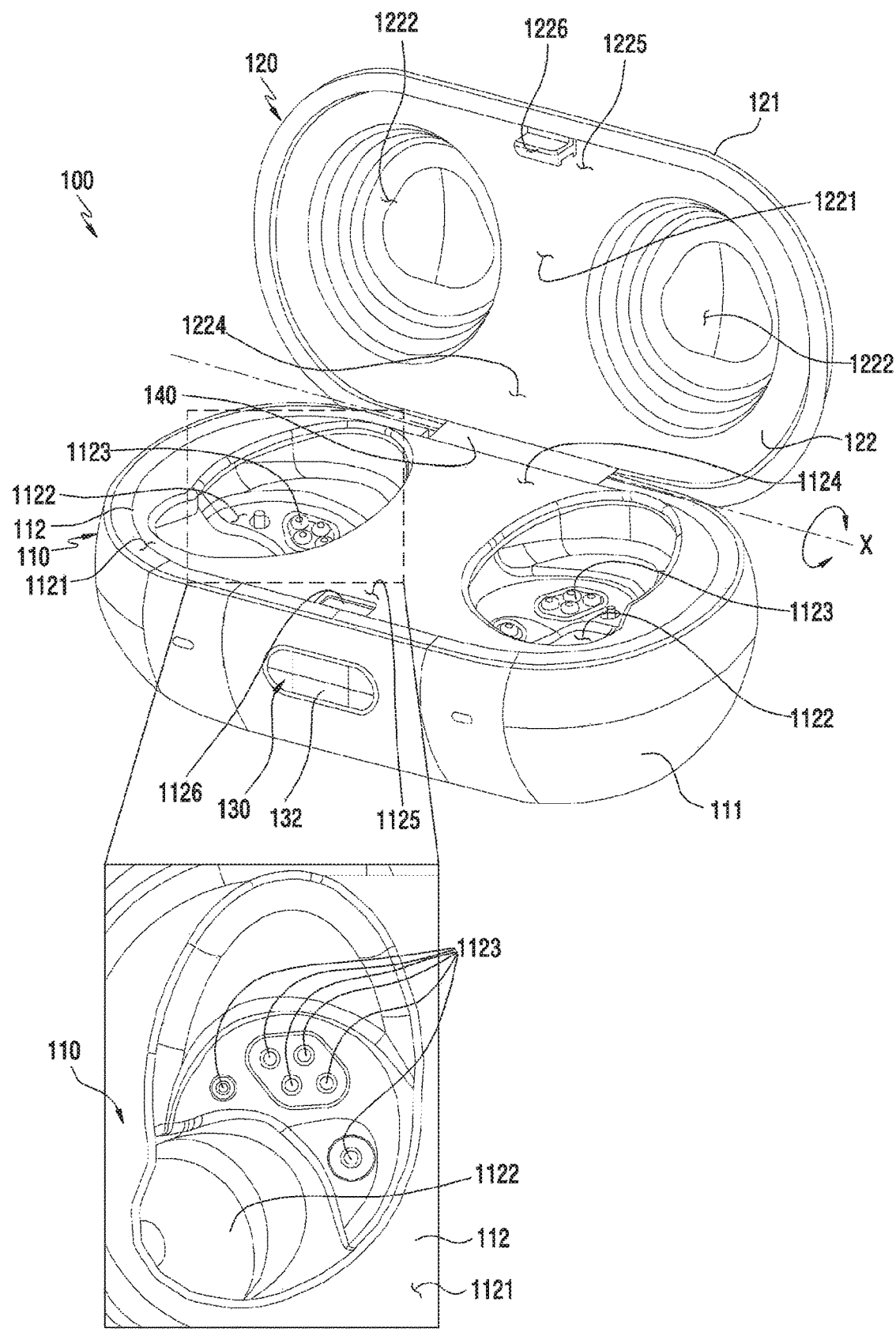
FIGS. 1A and 1B are perspective views of a case device illustrating a state in which a cover according to various embodiments of the disclosure is opened.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. Herein, the terms, such as "A or B," "at least one of A and B," "A, B, or C" and "one or more of A, B, and C," may include all possible combinations of items listed with the terms. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, the module may be configured as an application-specific integrated circuit (ASIC).

Various embodiments disclosed herein may be implemented by software (e.g., a program) including instructions stored in a machine (e.g., computer)-readable storage medium (e.g., internal memory or external memory). The machine may include an electronic device (e.g., an electronic device) according to the embodiments disclosed herein, which is capable of calling stored instructions from the storage medium and capable of operating according to the called instructions. When the instructions are executed by at least one processor, the processor may perform the function corresponding to the instructions, either directly or using other components under the control of the processor. The instructions may include codes generated or executed by a compiler or an interpreter. The machine-readable storage medium may be provided in the form of a non-transitory storage medium. Here, the term "non-transitory" means that the storage medium does not include a signal and is tangible, but does not distinguish whether data is stored semi-permanently or temporarily in a storage medium.

According to one embodiment, a device or a method according to various embodiments disclosed herein may be provided in the manner of being included in a computer program product. A computer program product may be traded between a seller and a purchaser as a commodity. The computer program product may be distributed on-line in the form of a machine-readable storage medium (e.g., a compact disc-read only memory (CD-ROM)) or via an application store (e.g., Play Store™). In the case of on-line distribution, at least a part of the computer program product may be temporarily stored in or temporarily produced from a storage medium such as a manufacturer's server, a server of an application store, or a memory of a relay server.

Each component (e.g., a module or a program) according to various embodiments may be configured as a single entity or a plurality of entities, and some of the aforementioned sub-components may be omitted, or other sub-components may be further included in various embodiments. Alternatively or additionally, some components (e.g., a module or a program) may be integrated as a single entity so as to perform the functions performed by respective components prior to integration in a similar or same manner. Operations performed by a module, a programming module, or other elements according to various embodiments may be executed sequentially, in parallel, repeatedly, or in a heuristic manner. At least some operations may be executed according to another sequence, may be omitted, or may further include other operations.

An electronic device according to embodiments of the disclosure may be applied as a case device for accommodating or charging an external electronic device (e.g., an earphone device). However, the disclosure is not limited thereto, and an electronic device including an arrangement structure of a plurality of magnets according to embodiments of the disclosure may be of a folder type, and may also be applicable to various devices other than an electronic device including a second body that operates in the openable/closable manner in the first body. According to various embodiments of the disclosure, the electronic device may not include a circuit.

Figure 1B:
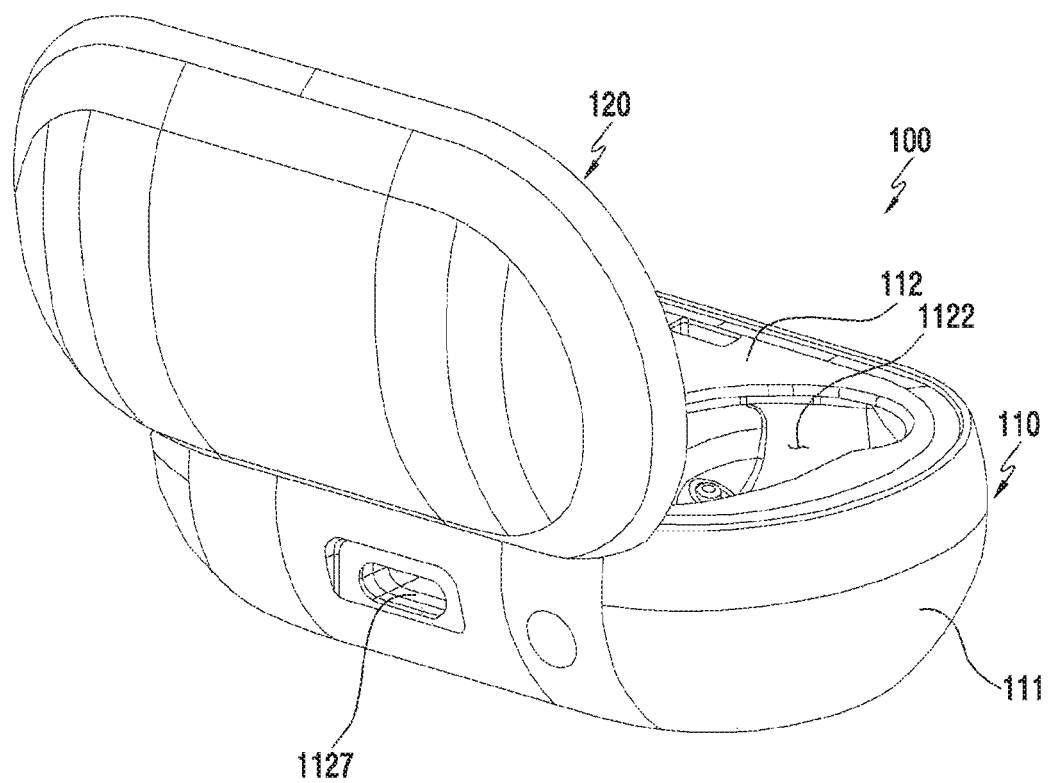
Figure 1C:
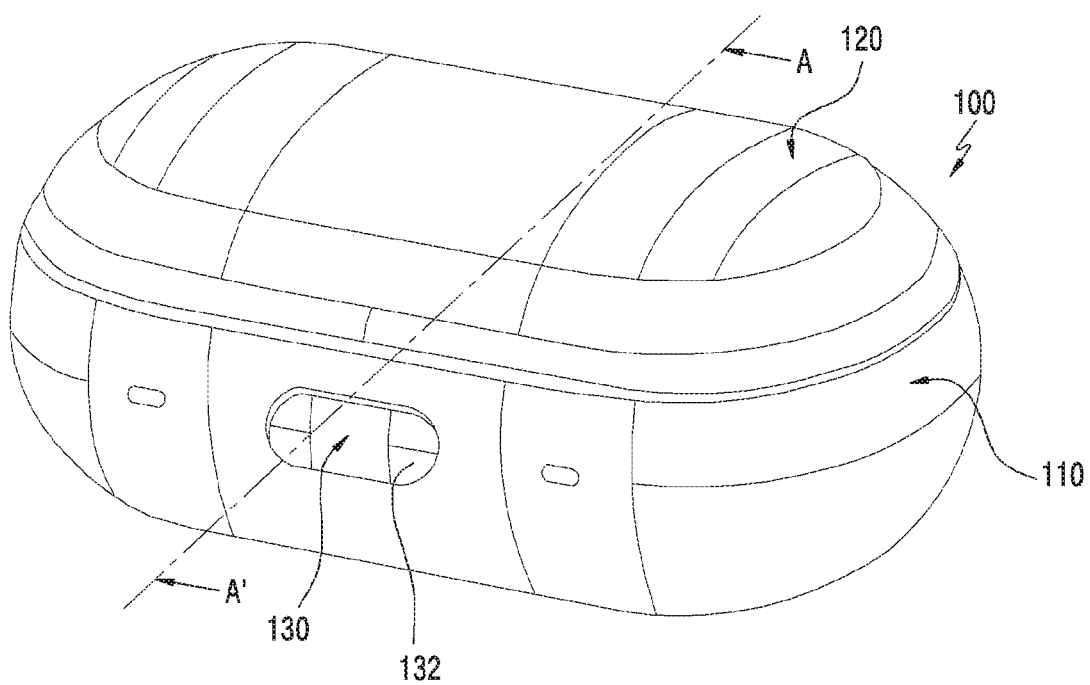
FIG. 1C is a perspective view of a case device illustrating a state in which the cover according to various embodiments of the disclosure is closed.
Figure 1D:
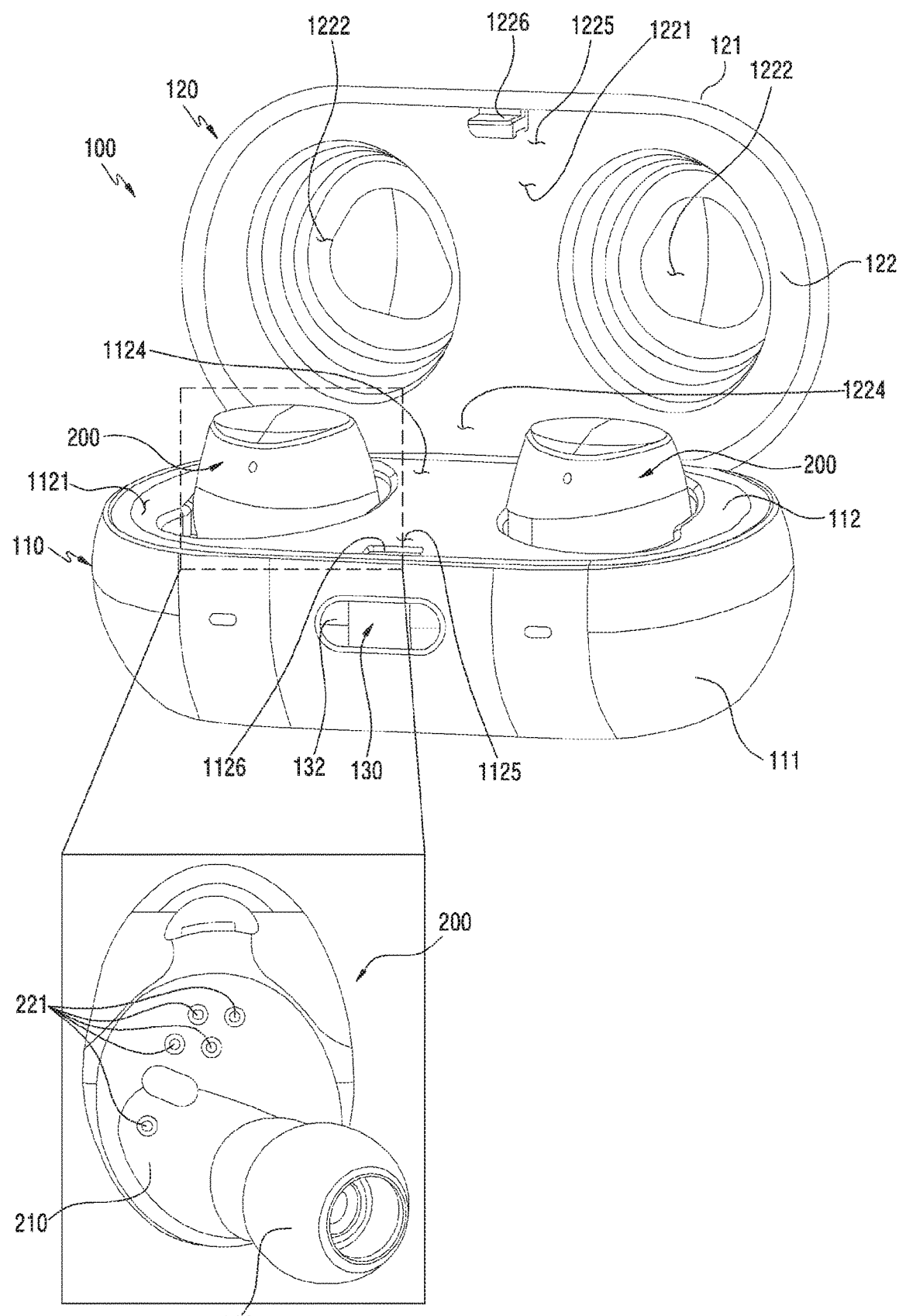
FIG. 1D is a perspective view illustrating a state in which an external electronic device is applied to the case device according to various embodiments of the disclosure.

FIGS. 1A and 1B are perspective views of an electronic device illustrating a state in which a cover according to various embodiments of the disclosure is opened. FIG. 1C is a perspective view of the electronic device illustrating a state in which the cover according to various embodiments of the disclosure is closed. FIG. 1D is a perspective view illustrating a state in which an external electronic device is applied to the electronic device according to various embodiments of the disclosure.

Referring to FIGS. 1A to 1C, an electronic device 100 (e.g., a case device) may include a housing 110 and a cover 120 installed to the housing 110 to be openable/closable by a predetermined angle by a hinge portion 140 (e.g., a hinge structure) in at least a portion. According to one embodiment, the housing 110 may include a button assembly 130 arranged so as to allow the cover 120 to open to an appropriate angle from a closed state by a pressing operation. According to one embodiment, the button assembly 130 may include a button 132 disposed to be exposed externally in at least a portion of the housing 110. According to one embodiment, the button 132 may be disposed in at least a portion of the body 111 of the housing 110 to be exposed.

According to various embodiments, the housing 110 may include a body 111 of a predetermined shape and a housing bracket 112 assembled to the upper portion of the body 111. According to one embodiment, the upper face 1121 of the housing bracket 112 may be exposed to the outside. According to one embodiment, the housing 110 may include at least one recess 1122 formed on the upper face 1121 of the housing bracket 112 and configured to accommodate at least a portion of an external electronic device (e.g., the external electronic device 200 of FIG. 1D). According to one embodiment, the bottom surface of the recess 1122 may include at least one conductive pin 1123. According to one embodiment, the at least one conductive pin 1123 may be oriented toward an external electronic device (e.g., an external electronic device 200 of FIG. 1D) that is mounted from the bottom of the recess 1122. According to one embodiment, the conductive pin 1123 may include a pogo pin or a resilient C-clip. According to one embodiment, at least one conductive pin 1123 disposed in the recess 1122 may include a detect pin configured to detect the mounting of the external electronic device (e.g., the external electronic device 200 of FIG. 1D), a charging pin, a data communication pin, or a ground (GND) pin. According to one embodiment, the housing 110 may include a connector port 1127 disposed in at least a portion of the body 111. According to one embodiment, when the connector port 1127 is electrically connected to a connector of an external power supply, the connector port 1127 may be used for charging the external electronic device (e.g., the external electronic device 200 of FIG. 1D) accommodated in the recess 1122 via the conductive pin 1123. However, the disclosure is not limited thereto, and the connector port 1127 may be used as a mediating means for data communication between the external electronic device accommodated in the recess 1122 (e.g., the external electronic device 200) and still another external electronic device.

According to various embodiments, the cover 120 may be installed at the housing 110 so as to be openable/closable at a predetermined angle by a hinge portion 140. According to one embodiment, the cover 120 may include an outer cover 121 forming an external appearance, a cover bracket 122 coupled to the outer cover 121 and having a counter face 1221 facing the upper face 1121 of the housing 110, and a middle bracket (e.g., a middle bracket 123 of FIG. 2B) interposed between the outer cover 121 and the cover bracket 122. According to one embodiment, the middle bracket (e.g., the middle bracket 123 of FIG. 2B) may provide a device accommodation groove 1222 corresponding to the recess 1122 through the cover bracket 122 at a position corresponding to the recess 1122 of the housing 110. According to one embodiment, the device accommodation groove 1222 may be formed to a depth for accommodating a portion of the external electronic device (e.g., the external electronic device 200 of FIG. 1D), which is at least partially accommodated in the recess 1122 and protrudes to the upper portion of the housing 110. For example, when the cover 120 is closed to the housing 110, the inner face of the device accommodation groove 1222 may be operated in the manner of coming into contact with the protruding portion of the external electronic device (e.g., the external electronic device 200 of FIG. 1D). The inner face of the device accommodation groove 1222 may be formed of a material for preventing scratches or the like caused by contact with the external electronic device (e.g., the external electronic device 200 of FIG. 1D). According to one embodiment, the inner face of the device accommodation groove 1222 may be formed of a material such as silicon, urethane, or rubber.

According to various embodiments, a button assembly 130 may be disposed in the housing 110. According to one embodiment, at least a portion of the button assembly 130 may include a button 132 that is partially exposed to the outside of the body 111 and is installed to be pressed. According to one embodiment, the button assembly 130 may include a hook structure (e.g., a hook structure 150 of FIG. 3A) coupled with a latching protrusion 1226 protruding from an end of the outer cover 121 of the cover 120. According to one embodiment, when the cover 120 is closed, the latching protrusion 1226 of the cover 120 may be inserted into a protrusion accommodation port 1126 formed at the corresponding position of the upper face 1121 of the housing 110, and may be latched to a protrusion latching portion (a protrusion latching portion 1311 of FIG. 2C) of the button assembly 130, thereby performing a latching operation for holding or assisting the closed state of the cover 120. Hereinafter, a hook structure (e.g., the hook structure 150 of FIG. 3A) will be described in detail.

According to various embodiments, in the hinge portion 140, a first portion 1124 of the housing 110 and a peripheral portion 1224 of the cover 120, which corresponds to the first portion 1124, may be coupled to each other such that the first peripheral portion 1224 rotates about an X-axis indicated in FIGS. 1A to 1D as a rotation axis to a predetermined angle at one side with respect to the recess 1122. According to one embodiment, the protrusion accommodation port 1126 may be disposed on the second portion 1125 of the housing 110 at the other side with respect to the recess 1122, and the latching protrusion 1226 may be disposed to protrude from a second peripheral portion 1225 of the cover 120, which corresponds to the protrusion accommodation port 1126. For example, when the cover 120 is closed, the cover 120 may be rotated about the hinge portion 140 and the latching protrusion 1226 of the cover 120 may be fully inserted into the protrusion accommodation port 1126 in the housing 110, so that the closing of the cover 120 can be completed.

Referring to FIG. 1D, one or more external electronic devices 200 (e.g., earphone devices) may be accommodated in the manner of at least partially seated in the recesses 1122 of the electronic device 100. According to one embodiment, when the external electronic devices 200 are applied as earphone devices (e.g., wired or wireless earphone devices), each of the external electronic devices 200 may include a body 210 and an earpiece 220 disposed to extend from the body 210. According to one embodiment, the body 210 may have at least one electrical connector 221 (e.g., one or more conductive terminals) disposed at a position corresponding to the at least one conductive pin 1123 that is disposed to protrude from the recess 1122 of the housing 110. According to one embodiment, when the external electronic devices 200 are accommodated in the recesses 1122 and the cover 120 is closed, the external electronic devices 200 may be pressed by the inner faces of the device accommodation groove(s) 1222 of the cover 120, and the conductive pins 1123 protruding upward may have elasticity (e.g., restoring force) and may be pushed by the at least one connector 221 (in the form of conductive terminals) of the external electronic devices 200 so as to be held in a state of being retracted to some extent. For example, when the cover 120 is completely closed, the conductive pins 1123 may perform a reliable physical contact with the at least one connector 221 (in the form of conductive terminals) of the external electronic devices 200.

According to various embodiments, the electronic device 100 may be configured such that by placing a plurality of magnets of different polarities or the same polarity at the designated positions, the closed state of the cover 120 is maintained on the housing 110 or the cover 120 is opened to a specific opening angle at a time merely by operating the button 132. For example, the electronic device 100 may provide a convenient opening/closing operation of the cover 120. As another example, the user is allowed to operate the electronic device 100 with one hand, thereby improving the convenience of operation.

Figure 2A:
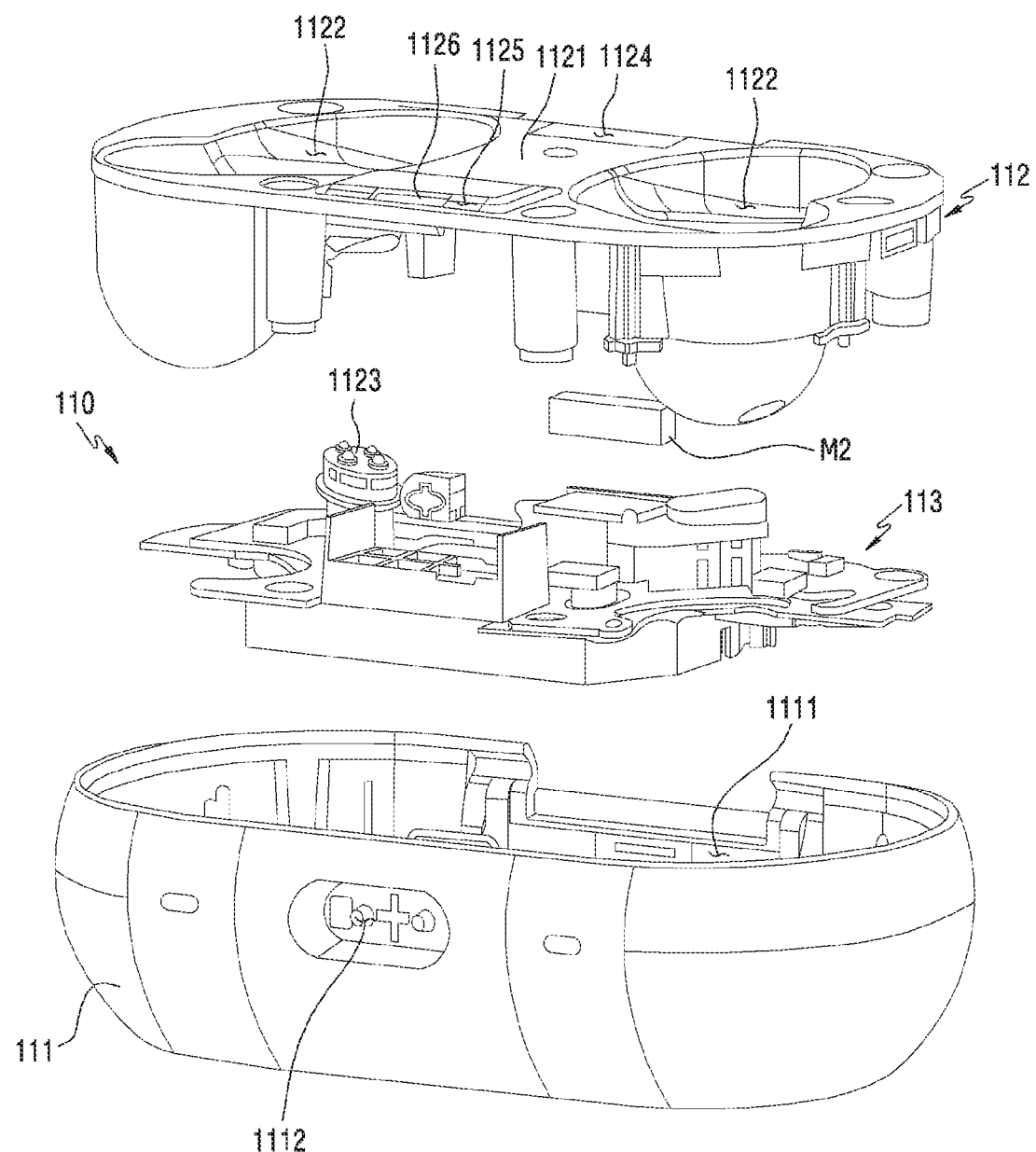
FIG. 2A is an exploded perspective view illustrating a configuration of a housing of a case device according to various embodiments of the disclosure.
Figure 2B:
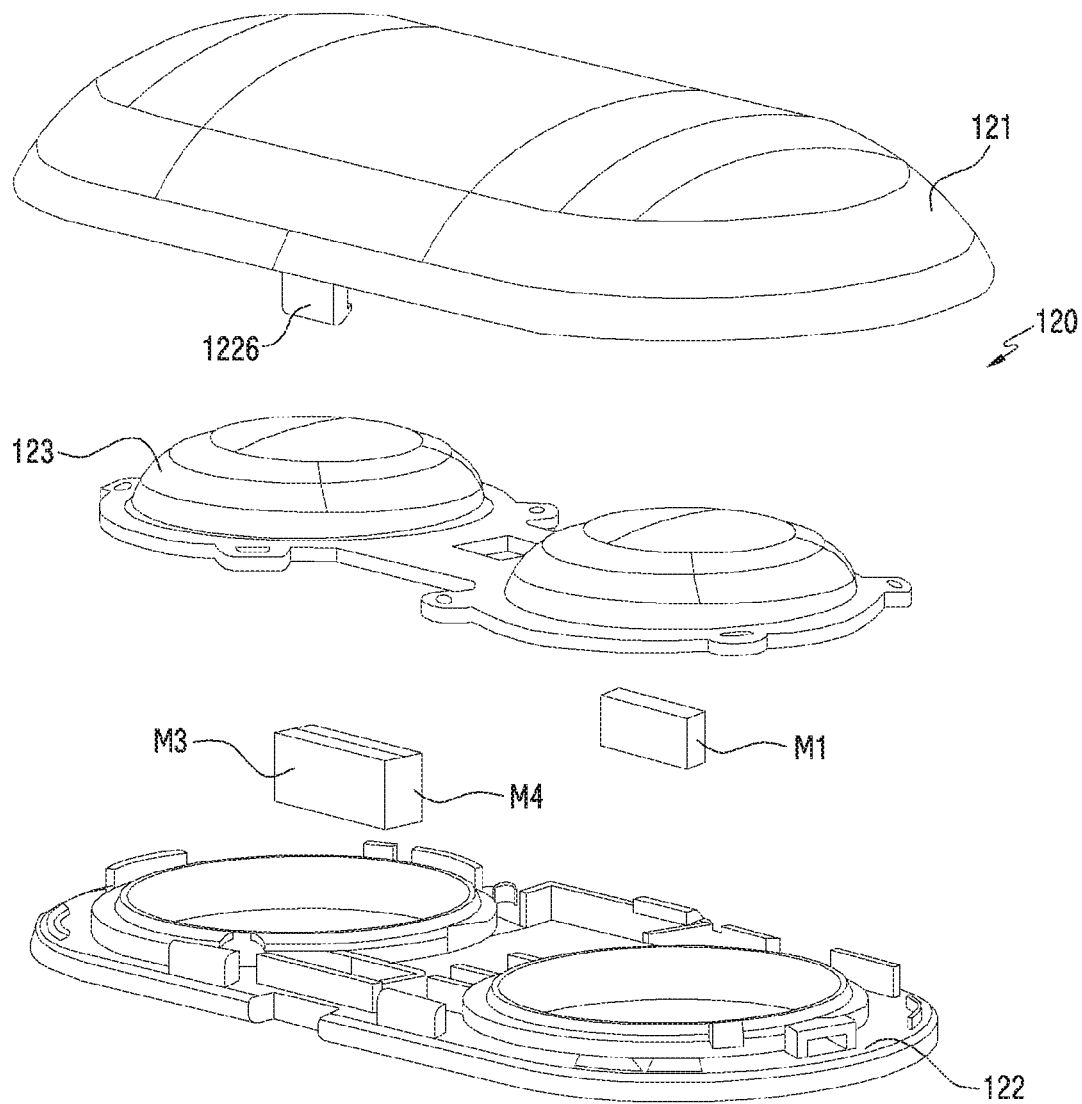
FIG. 2B is an exploded perspective view illustrating a configuration of the cover of the case device according to various embodiments of the disclosure.
Figure 2C:
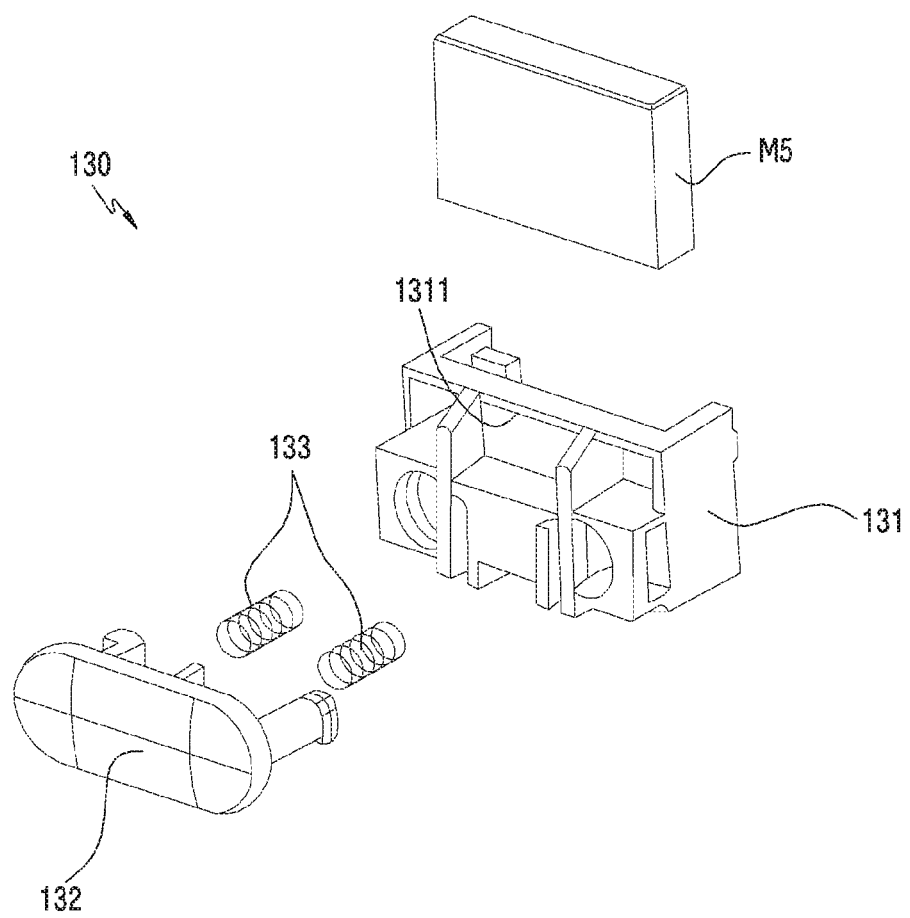
FIGS. 2C and 2D are perspective views illustrating a button assembly of the case device according to various embodiments of the disclosure in a disassembled state and an assembled state, respectively.
Figure 2D:
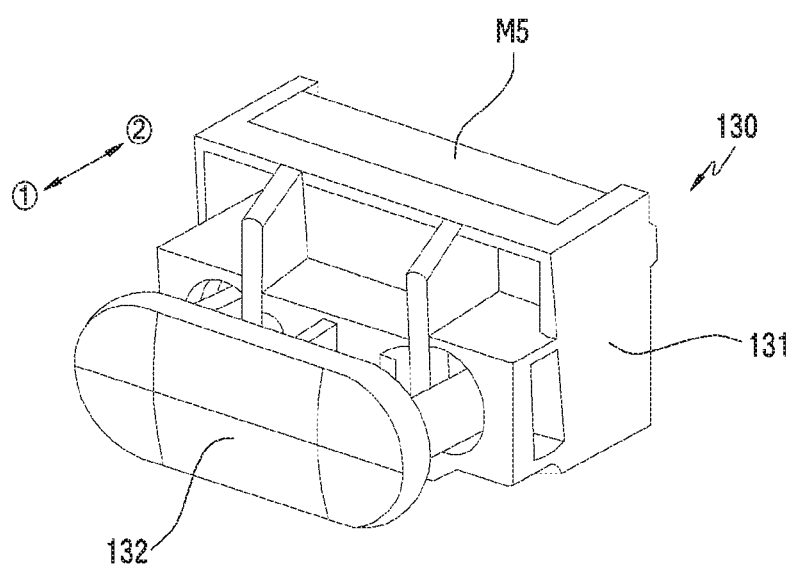

FIG. 2A is an exploded perspective view illustrating a configuration of a housing of an electronic device according to various embodiments of the disclosure. FIG. 2B is an exploded perspective view illustrating a configuration of the cover of the electronic device according to various embodiments of the disclosure. FIGS. 2C and 2D are perspective views illustrating a button assembly of the electronic device according to various embodiments of the disclosure in a disassembled state and an assembled state, respectively.

The structures of the housing, the cover, and the button assembly and the arrangement relationship of the magnets applied thereto may be described with reference to FIGS. 2A to 2D.

Referring to FIG. 2A, the housing 110 may include a body 111, at least one housing bracket 112 coupled with the body 111 and providing an upper face 1121 of the housing 110 and at least one recess 1122 formed in the upper face 1121, and a substrate assembly 113 disposed in the inner space 1111 of the body 111. According to one embodiment, the body 111 may include a button accommodation port(s) 1112 formed to expose at least a portion of a button 132 to the outside of the housing 110. According to one embodiment, the substrate assembly 113 may include, for example, a circuit or the like that is electrically connected to the conductive pin 1123. According to one embodiment, the housing 110 has a second magnet M2, which may be disposed in the housing 110 to correspond to a position corresponding to the first portion 1124 (e.g., in the vicinity of the hinge portion) of the upper face 1121.

Referring to FIG. 2B, the cover 120 may include an outer cover 121 forming the external appearance, a cover bracket 122 coupled to the outer cover 121, and a middle bracket 123 disposed between the cover bracket 122 and the outer cover 121. According to one embodiment, a first magnet M1 may be disposed at a position corresponding to a first peripheral portion of the cover 120 (e.g., the first peripheral portion 1224 of FIG. 1A). According to one embodiment, a third magnet M3 and a fourth magnet M4 may be disposed in a first peripheral portion (e.g., the first peripheral portion 1224 of FIG. 1A) of the cover 120 and a second peripheral portion (e.g., the second peripheral portion 1225 of FIG. 1A), which is opposed to the first peripheral portion 1224. However, the disclosure is not limited to this, and the third magnet M3 and the fourth magnet M4, which are separately disposed, may be replaced with one magnet in which different polarities (e.g., N and S poles) are arranged parallel to each other, so as to correspond to the moving position of a fifth magnet M5. According to one embodiment, the first magnet M1 disposed in the first peripheral portion (e.g., the first peripheral portion 1224 of FIG. 1A) of the cover 120 and the second magnet M2 disposed in the first portion 1124 of the housing 110 may be disposed at positions where the first and second magnets M1 and M2 mutually react to a magnetic force when the cover 120 is closed.

Referring to FIGS. 2C and 2D, the button assembly 130 may include a button bracket 131 disposed in the body 111 of the housing 110 to be movable in a button pressing direction (e.g., in the direction C)), a button 132 configured to be movable with the button bracket 131 and installed to be partially exposed to the outside through the button accommodation port(s) 1112 of the body 111, and at least one elastic member 133 (e.g., a spring) disposed between the button 132 and the body 111 so as to return the button 132, which is pressed, and the button bracket 131, which moves with the button 132, to the original positions thereof (e.g., in the direction ①). According to one embodiment, the button bracket 131 is provided with a protrusion latching portion 1311 formed such that the end of the latching protrusion 1226 of the cover 120 accommodated from the protrusion accommodated port 1126 of the housing 110 can be latched to the protrusion latching portion 1311. According to one embodiment, the button bracket 131 may be provided with the fifth magnet M5.

According to various embodiments, the fifth magnet M5 may be disposed in the second portion 1125 of the housing to react to the magnetic force of any one of the third magnet M3 and the fourth magnet M4 disposed in the second peripheral portion (e.g., the second peripheral portion 1225 in FIG. 1A) of the cover 120. According to one embodiment, the fifth magnet M5 may be moved to a position where the fifth magnet M5 reacts to the third magnet M3 or the fourth magnet M4, according to the movement of the button bracket 131, which is caused by the pressing of the button 132. For example, in an initial stage where the button 132 is not pressed, the fifth magnet M5 may be located at a position where the fifth magnet M5 reacts to the magnetic force of the third magnet M3, and in the state in which the button 132 is pressed, the fifth M5 may move together with the button bracket 131 to a position where the fifth magnet M5 reacts to the magnetic force of the fourth magnet M4.

According to various embodiments, the first magnet M1 disposed in the first peripheral portion of the cover 120 (e.g., the first peripheral portion 1224 in FIG. 1A) and the second magnet M2 disposed in the first portion 1124 of the housing 110 may be disposed such that a repulsive force due to the same polarity can be generated when the first magnet M1 and the second magnet M2 are placed at positions where the first magnet M1 and the second magnet M2 mutually react to a magnetic force. According to one embodiment, the first magnet M1 and the second magnet M2 may be disposed such that a repulsive force is generated to push the cover 120 in the direction of opening the cover 120 from the housing 110 when the cover 120 is opened from the housing 110. According to one embodiment, the third magnet M3 disposed in the second peripheral portion of the cover 120 (e.g., the second peripheral portion 1225 in FIG. 1A) and the fifth magnet M5 disposed in the second portion 1125 of the housing 110 may be disposed such that a repulsive force due to the same polarity can be generated when the third magnet M3 and the fifth magnet M5 are placed at positions where the third magnet M3 and the fifth magnet M5 mutually react to a magnetic force. For example, the third magnet M3 and the fifth magnet M5 may be disposed such that in the state in which the button 132 is not pressed and the cover 120 is closed to the housing 110, an attractive force is generated between the third magnet M3 and the fifth magnet M5. According to one embodiment, the fourth magnet M4 disposed in the second peripheral portion of the cover 120 (e.g., the second peripheral portion 1225 in FIG. 1A) and the fifth magnet M5 disposed in the second portion 1125 of the housing 110 may be disposed such that a repulsive force due to the same polarity can be generated when the fourth magnet M4 and the fifth magnet M5 are placed at positions where the fourth magnet M4 and the fifth magnet M5 mutually react to a magnetic force. For example, the fourth magnet M4 and the fifth magnet M5 may be disposed so as to generate a repulsive force for pushing each other when the button 132 is pressed and the button bracket 131 is moved in the pressing direction. For example, when the button 132 is pressed, the repulsive force may provide a force to open the cover 120 from the housing 110 to some extent, and the repulsive force between the first magnet M1 and the second magnet M2 may provide a force to open the cover 120 from the housing 110. For example, by simply pressing the button 132 in the state in which the cover 120 is closed, the cover 120 may be opened from the housing 110 by the repulsive force between the fifth magnet M5 and the fourth magnet M4 and the repulsive force between the first magnet M1 and the second magnet M2.

Hereinafter, the operation of opening the cover 120 from the housing 110 will be described with reference to FIGS. 3A to 3D. FIGS. 3A to 3D are cross-sectional views taken along line A-A' in FIG. 1C.

Figure 3A:
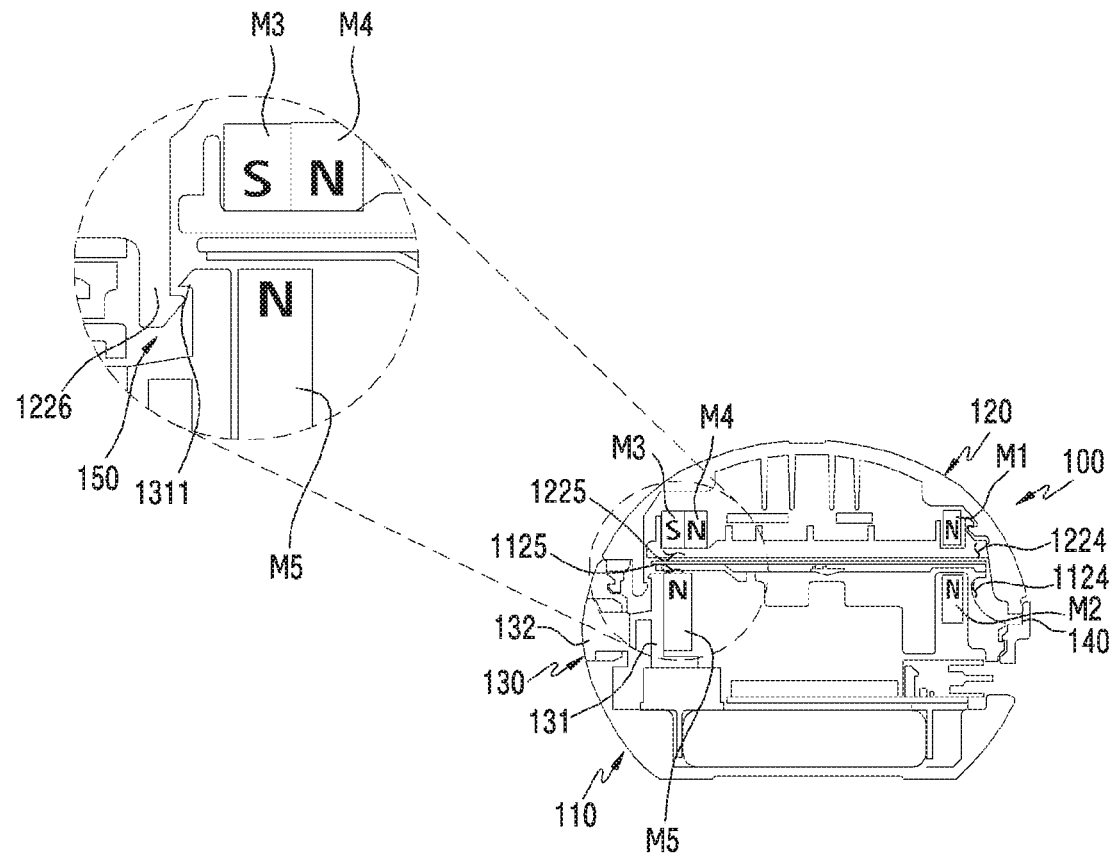
FIG. 3A is a cross-sectional view illustrating a main portion in the state in which the cover of the case device according to various embodiments of the disclosure is closed.

FIG. 3A is a cross-sectional view illustrating a main portion in the state in which the cover of the electronic device according to various embodiments of the disclosure is closed.

Referring to FIG. 3A, when the cover 120 is completely closed to the housing 110, the cover 120 is able to continuously maintain the closed state with the housing 110 by the attractive force of the between the fifth magnet M5 disposed in the second portion 1125 of the housing 110 and the third magnet M3 disposed in the second peripheral portion 1225 of the cover 120, even if a repulsive force is generated between the first magnet M1 disposed in the first peripheral portion 1224 of the cover 120 and the second magnet M2 disposed in the first portion M1 of the housing 110. For example, the magnitude of the magnetic force of each magnet can be set such that the attractive force between the fifth magnet M5 and the third magnet M3 is greater than the repulsive force between the first magnet M1 and the second magnet M2.

According to various embodiments, a hook structure 150 may be provided subsidiarily, even if the cover 120 maintains the closed state by the attractive force between the fifth magnet M5 and the third magnet M3. According to one embodiment, the hook structure 150 may be configured such that when the cover 120 is completely closed to the housing 110, the latching protrusion 1226 of the cover 120 is latched to a protrusion latching groove 1311 of the button bracket 131. According to one embodiment, when the hook structure 150 is applied so as to assist the attractive force between the fifth magnet M5 and the third magnet M3 when the cover 120 is completely closed to the housing 110, the latching force of the hook structure 150 may be set not to be greater than the repulsive force between the first magnet M1 and the second magnet M2. As another example, in order for the cover 120 to maintain in the closed state in the housing 110, the sum of the attractive force between the fifth magnet M5 and the third magnet M3 and the hooking force of the hook structure 150 may be set to be larger than the repulsive force between the magnet M1 and the second magnet M2.

Figure 3B:
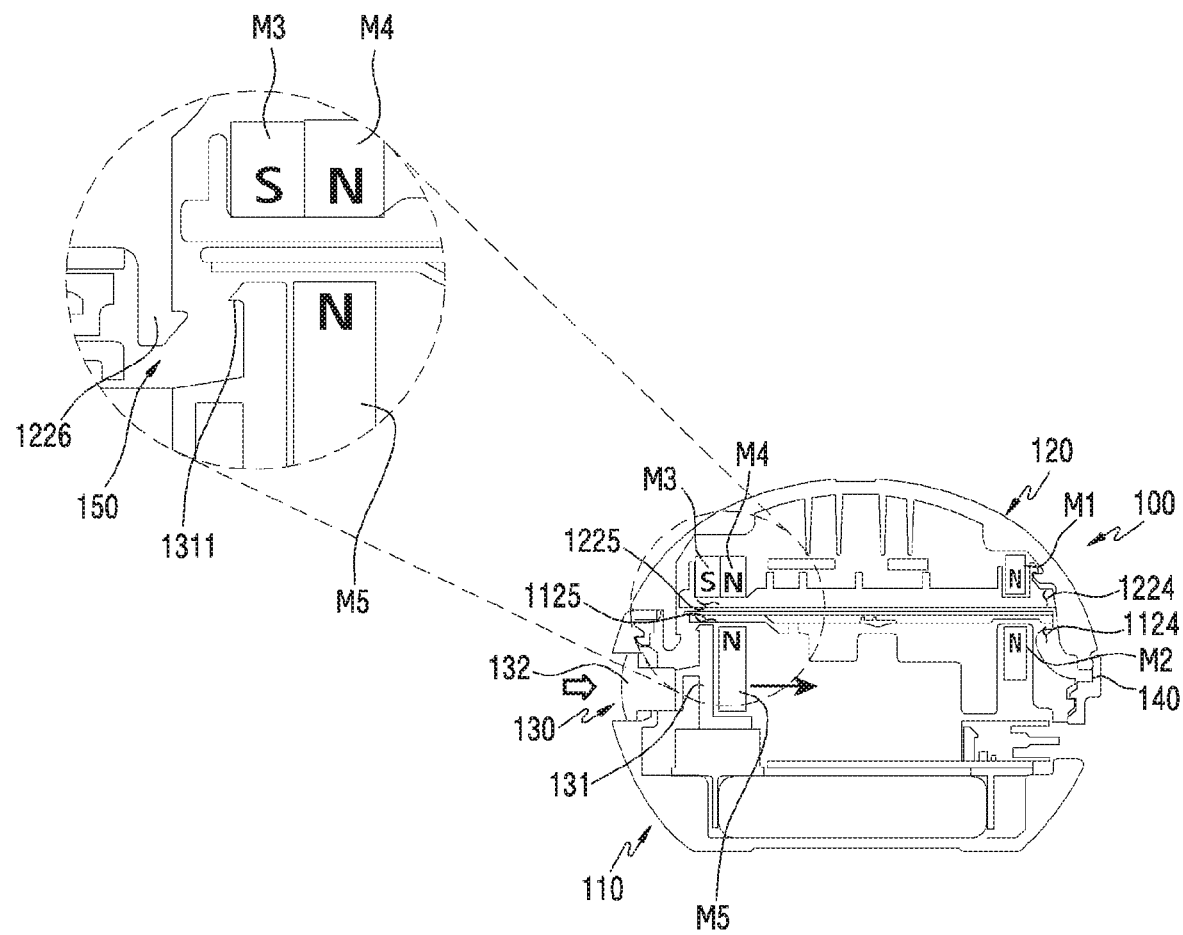
FIG. 3B is a cross-sectional view illustrating the main portion in the state in which the button of the case device according to various embodiments of the disclosure is pressed.

FIG. 3B is a cross-sectional view illustrating the main portion in the state in which the button of the electronic device according to various embodiments of the disclosure is pressed.

Referring to FIG. 3B, when the button 132 of the button assembly 130 is pressed in order to open the cover 120, the button bracket 131 may also be moved in the pressing direction together with the button 132. According to one embodiment, the fifth magnet M5 can be moved in the direction from the third magnet M3 to the fourth magnet M4 of the cover 120 by the movement of the button bracket 131. According to one embodiment, since the fifth magnet M5 and the fourth magnet M4 can be disposed to have a mutual repulsive force, the cover 120 can be turned into the state of being opened to some extent from the housing 110 by the repulsive force. According to one embodiment, when the hook structure 150 is included, the latching protrusion 1226 of the cover 120 is released from the protrusion latching groove 1311 of the button bracket 131 by the movement of the button bracket 131, the cover 120 can be opened.

Figure 3C:
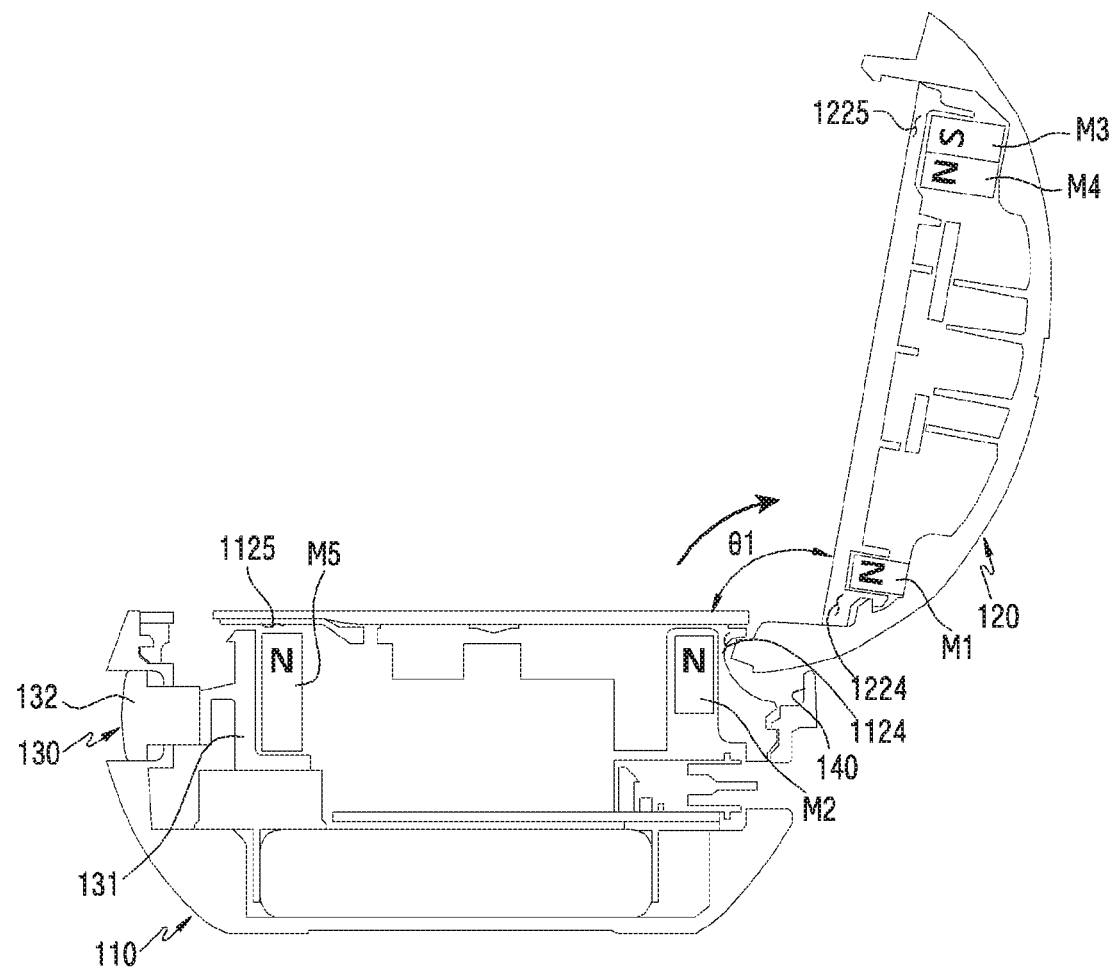
FIG. 3C is a cross-sectional view illustrating the main portion in the state in which the cover of the case device according to various embodiments of the disclosure is fully opened.

FIG. 3C is a cross-sectional view illustrating the main portion in the state in which the cover of the electronic device according to various embodiments of the disclosure is fully opened.

Referring to FIG. 3C, the repulsive force between the fifth magnet M5 and the fourth magnet M4 and the repulsive force between the first magnet M1 and the second magnet M2 can act so as to open the cover 120 from the housing 110 by the repulsive forces. For example, by simply pressing the button 132, the cover 120 may be opened from the housing 110 to a complete open angle θ1 by the repulsive force between the fifth magnet M5 and the fourth magnet M4 and the repulsive force between the first magnet M1 and the second magnet M2.

Figure 3D:
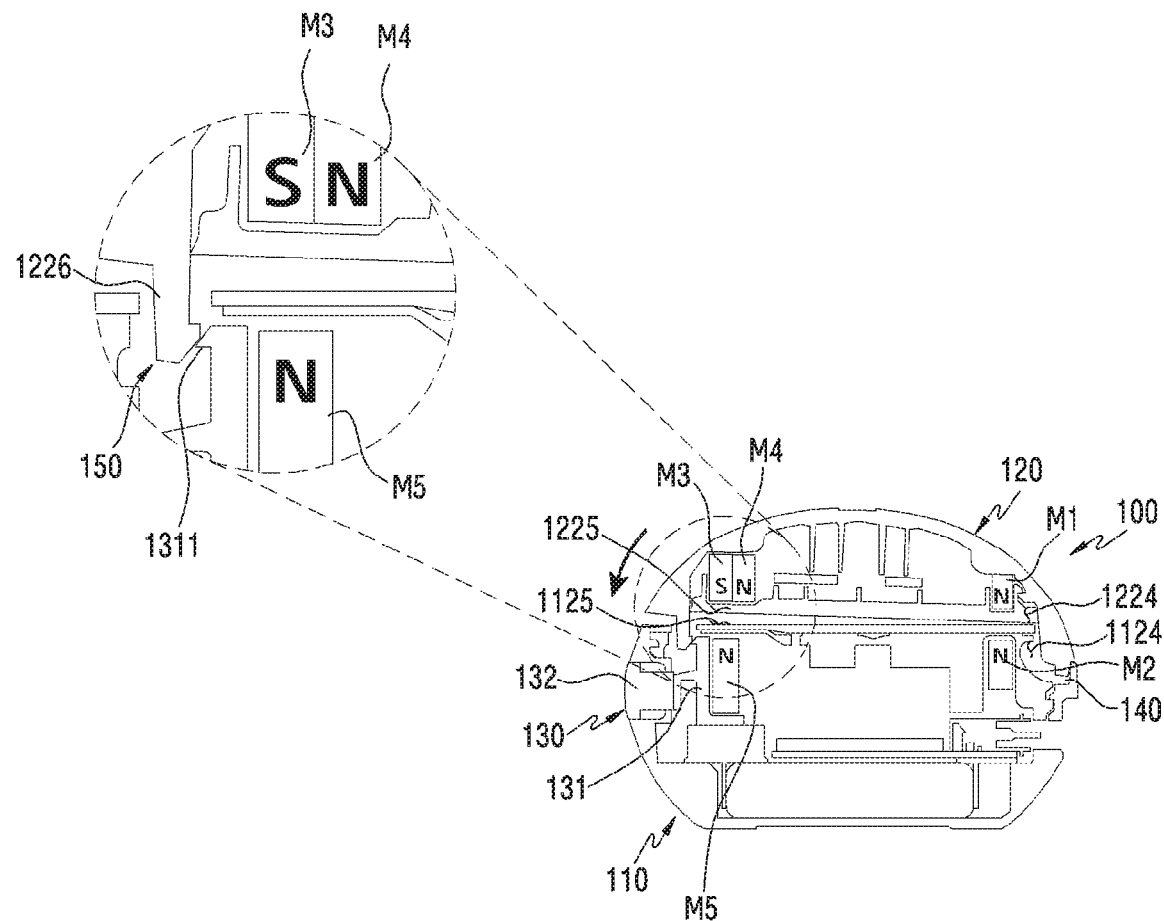
FIG. 3D is a cross-sectional view illustrating the main portion in the state in which the cover of the case device according to various embodiments of the disclosure is just before fully closed.

FIG. 3D is a cross-sectional view illustrating the main portion in the state in which the cover of the electronic device according to various embodiments of the disclosure is just before fully closed.

Referring to FIG. 3D, the cover 120 may be closed in the manner of facing the housing 110. According to one embodiment, since the button 132 is in the state in which the pressing force is removed, the fifth magnet M5 can maintain the state of being returned to the original position thereof by restoring to the original state thereof. For example, when the cover 120 is closed in the manner of facing the housing 110, the fifth magnet M5 is disposed again at a position facing the third magnet M3, whereby the cover 120 can be closed in the manner of being in contact with the housing 110 by the mutual attractive force and the state can be maintained. According to one embodiment, in the case where the hook structure 150 is included, when the cover 120 is completely closed, the latching protrusion 1226 of the cover 120 is inserted into the protrusion accommodation port 1126 of the housing 110 and is then latched to the protrusion latching groove 1311 of the button bracket 131, so that the closed state of the cover 120 can be firmly maintained. According to one embodiment, in order for the cover 120 to maintain in the closed state in the housing 110, theسum of the attractive force between the fifth magnet M5 and the third magnet M3 and the hooking force of the hook structure 150 may be set to be larger than the repulsive force between the magnet M1 and the second magnet M2.

Figure 4A:
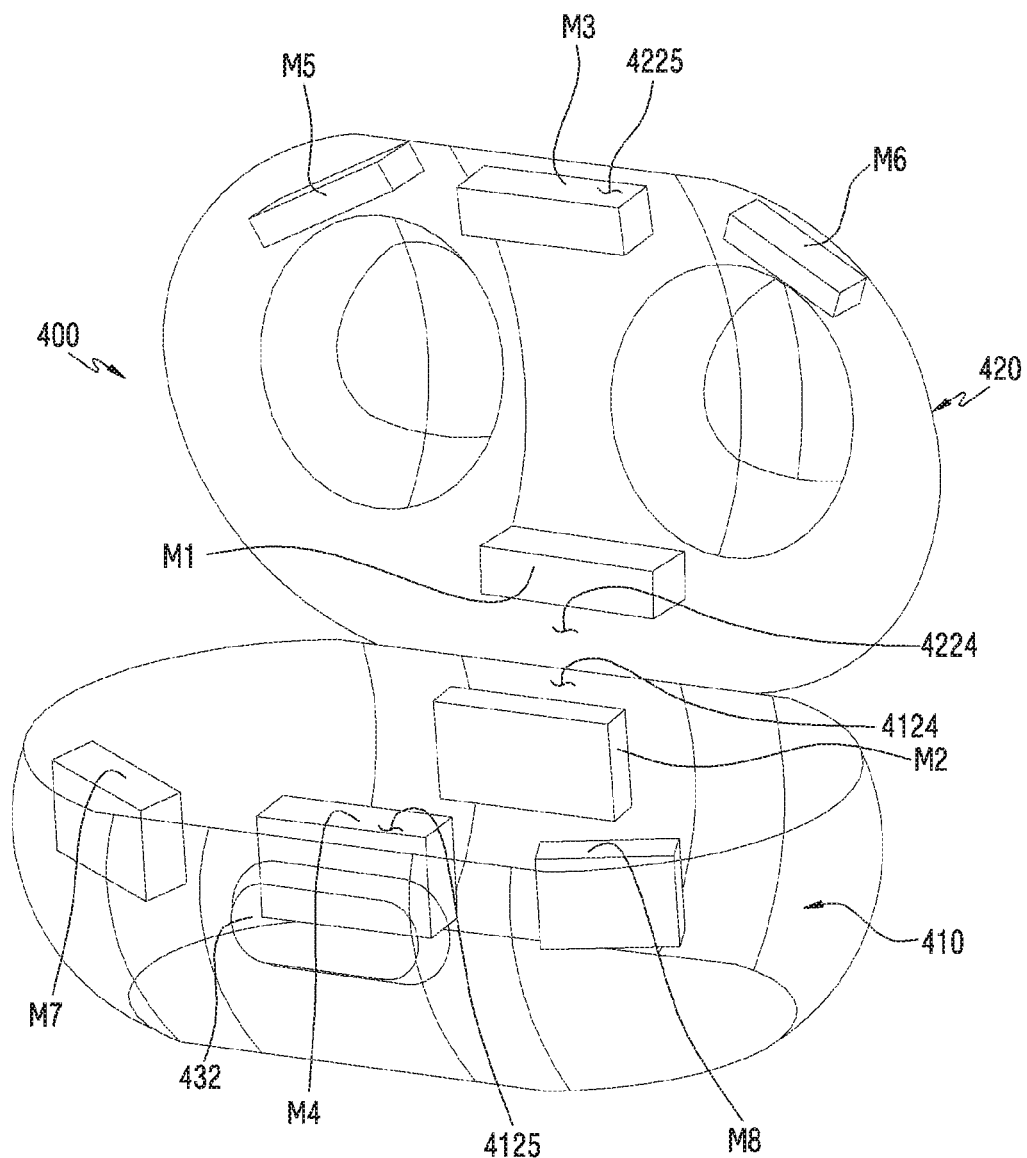
FIGS. 4A and 4B are configuration views illustrating an arrangement of magnets of the case device according to various embodiments of the disclosure.
Figure 4B:
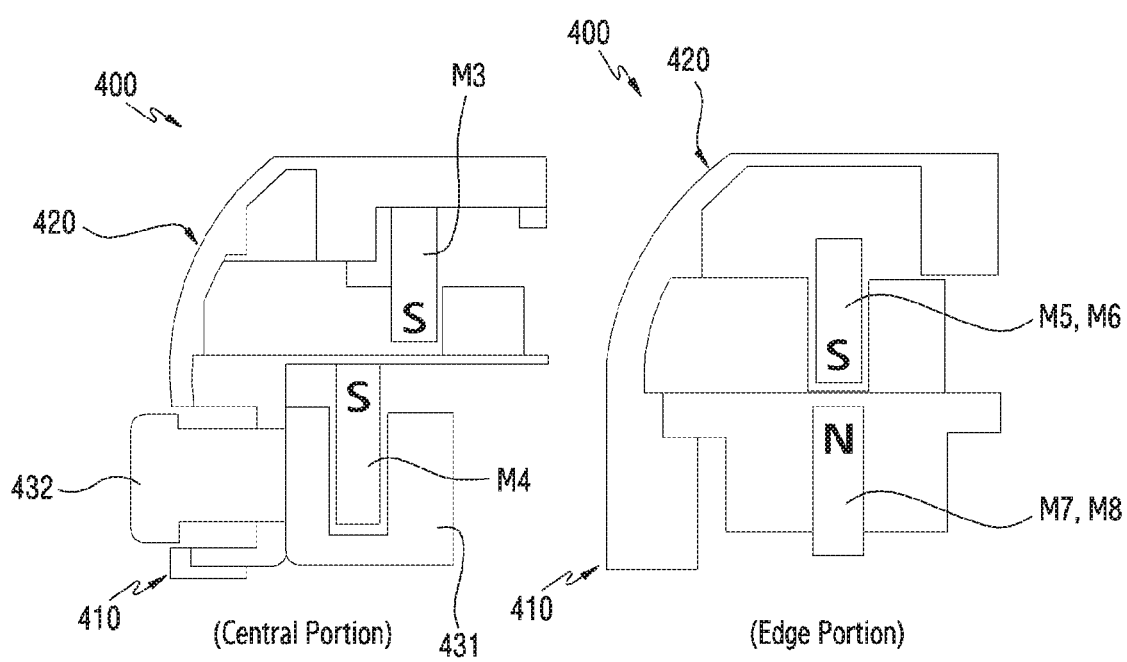
Figure 4C:
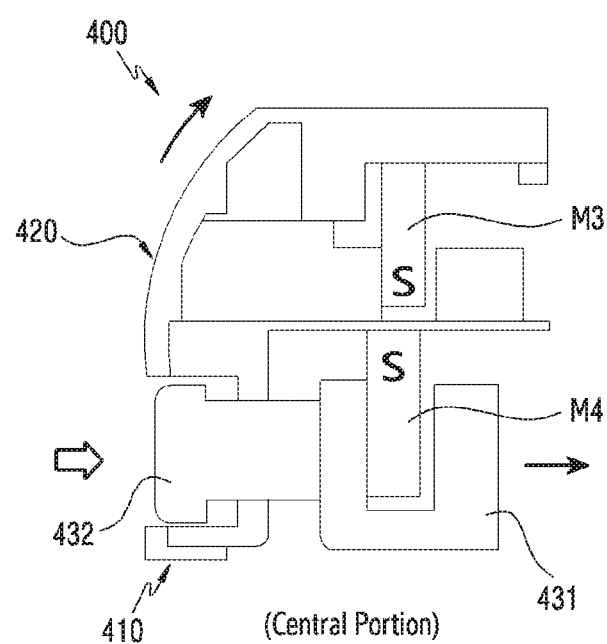
FIG. 4C is a view illustrating a state in which the cover of the case device of FIG. 4A is opened according to various embodiments of the disclosure.

FIGS. 4A and 4B are configuration views illustrating an arrangement of magnets of the electronic device according to various embodiments of the disclosure. FIG. 4C is a view illustrating a state in which the cover of the electronic device of FIG. 4A is opened according to various embodiments of the disclosure.

The electronic device 400 of FIGS. 4A to 4C may be at least partially similar to the electronic device 100 of FIG. 1A to 1D, or may include other embodiments of the electronic device.

Referring to FIG. 4A, the electronic device 400 may include a housing 410 and a cover 420 disposed to be openable/closable in the housing 410. According to one embodiment, at least one recess (e.g., the recess 1122 of FIG. 1A) configured to accommodate an external electronic device (e.g., the external electronic device 200 of FIG. 1D) disposed in the housing 410, and the hinge portion (e.g., the hinge portion 140 in FIG. 1A) have been omitted for the convenience of explanation, and the arrangement structure of a plurality of magnets M1 to M8 will be mainly described.

According to various embodiments, the cover 420 may include a first magnet M1 disposed in a first peripheral portion 4224 in the vicinity of the hinge portion, a third magnet M3 disposed in a second peripheral portion 4225 to be opposite the first peripheral portion 4224, and fifth and six magnets M5 and M6, which are disposed along the rim of the cover 420 around the third magnet M3 with the third magnet M3 being interposed therebetween. According to one embodiment, the housing 410 may include a second magnet M2 disposed in the first portion 4124 in the vicinity of the hinge portion corresponding to the first peripheral portion 4224 and reacting to the magnetic force of the first magnet M1, a fourth magnet M4 disposed in the second portion 4125 opposite the first portion 4124 and reacting to the magnetic force of the third magnet M3 at a position shifted by pressing the button 432, and seventh and eighth magnets M7 and M8 that are disposed at positions where the seventh and eighth magnets M7 and M8 react to the magnetic forces of the fifth and sixth magnets M5 and M6 in the rim of the housing 410 with the fourth magnet M4 being interposed therebetween.

According to various embodiments, the first magnet M1 and the second magnet M2 may be disposed such that when the first magnet M1 and the second magnet M2 correspond to each other, a repulsive force is generated, and the third magnet M3 and the fourth magnet M3 may also be disposed such that when the third magnet M3 and the fourth magnet M4 correspond to each other, a repulsive force is generated. According to one embodiment, the fifth magnet M5 and the sixth magnet M6 may be disposed such that an attractive force is generated when the fifth magnet M5 and the sixth magnet M6 correspond to the seventh magnet M7 and the eighth magnet M8, respectively.

Referring to 4B, in the state in which the cover 420 is closed to the housing 410, the fourth magnet M4 and the third magnet M3 are disposed in a state of being deviated from each other, so that the fourth magnet M4 and the third magnet M3 may be maintained in the state in which they do not mutually react to a magnetic force. According to one embodiment, the fifth magnet M5 and the sixth magnet M6 may be disposed such that an attractive force acts between the fifth magnet M5 and the seventh magnet M7 and between the sixth magnet M6 and the eighth magnet M8. For example, even if the first magnet M1 and the second magnet M2 are disposed at positions where a repulsive force is generated, the cover 420 can be maintained in the closed state in the housing 410 by the attractive force between the fifth magnet M5 and the seventh magnet M7 and the attractive force between the sixth magnet M6 and the eighth magnet M6. For example, the magnetic forces of the magnets may be set such that the attractive forces described above act more strongly than the repulsive forces.

Referring to FIG. 4C, when the button 432 is pressed to open the cover 420 from the housing 410 such that the fourth magnet M4 disposed on the button bracket 431 is moved to a position where the fourth magnet M4 reacts to the magnetic force of the third magnet M3, a repulsive force can be generated between the third magnet M3 and the fourth magnet M4. For example, when the repulsive force between the third magnet M3 and the fourth magnet M4 is set to be greater than the attractive force between the fifth magnet M5 and the seven magnet M7 and the attractive force between the sixth magnet M6 and the eighth magnet M8, the cover 420 can be opened. According to one embodiment, the cover 420 can be opened by a specified amount by being supported by the repulsive force between the first magnet M1 and the second magnet M2.

Figure 5A:
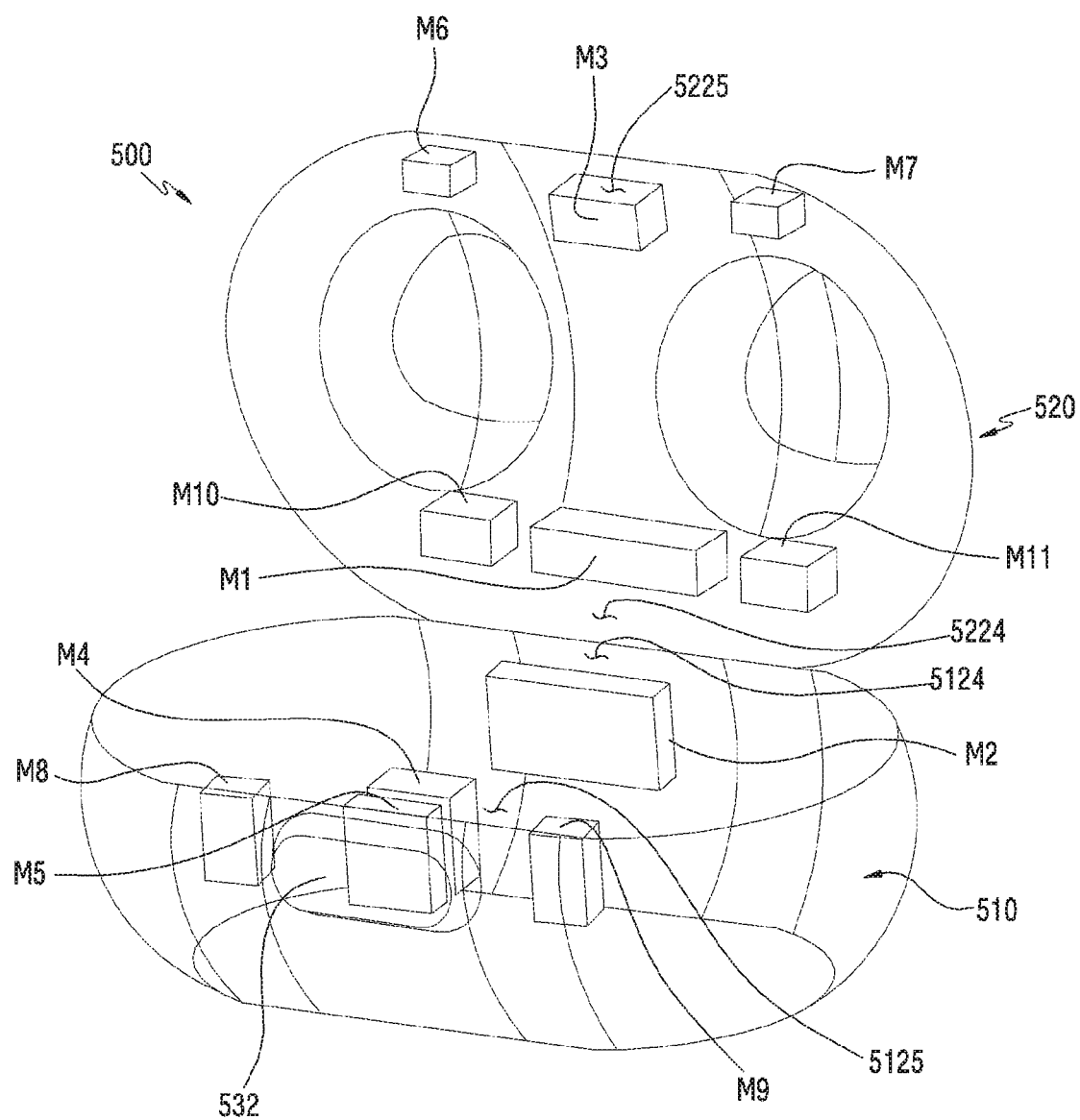
FIGS. 5A and 5B are configuration views illustrating an arrangement of magnets of the case device according to various embodiments of the disclosure.
Figure 5B:
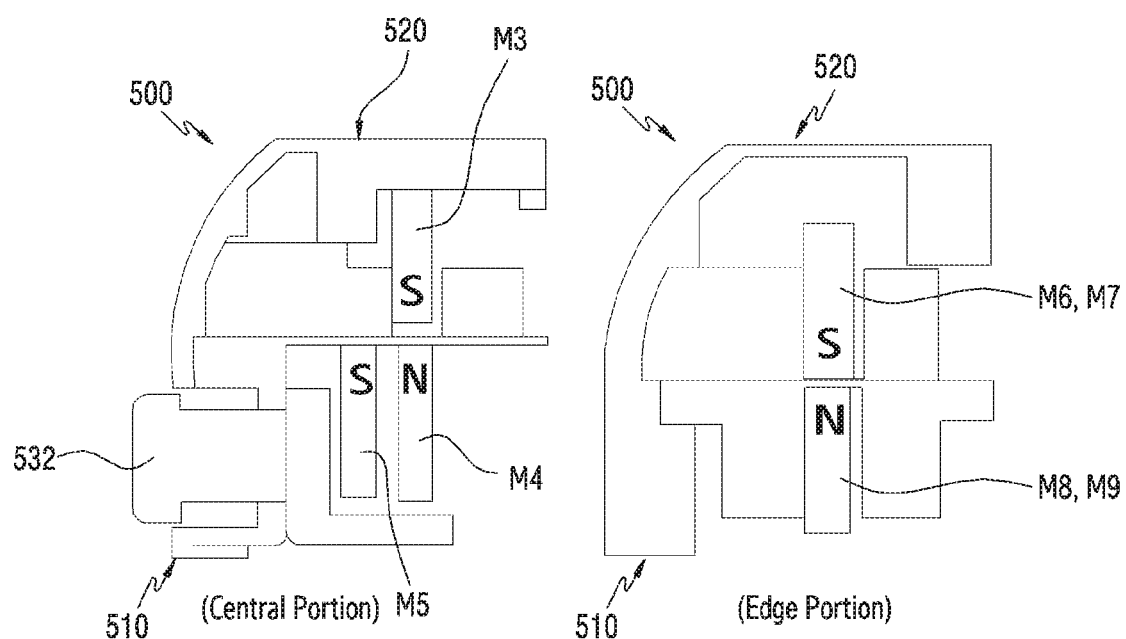
Figure 5C:
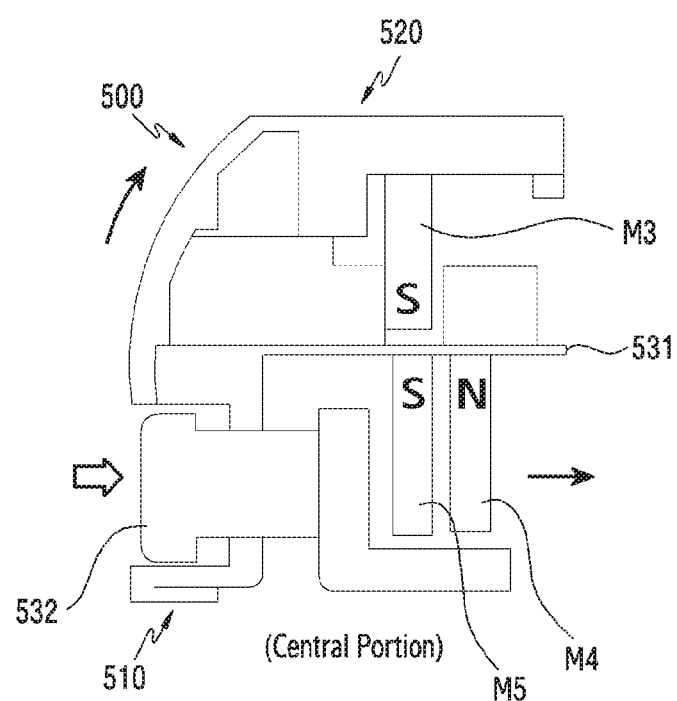
FIG. 5C is a view illustrating a state in which the cover of the case device of FIG. 5A is opened according to various embodiments of the disclosure.

FIGS. 5A and 5B are configuration views illustrating an arrangement of magnets of the electronic device according to various embodiments of the disclosure. FIG. 5C is a view illustrating a state in which the cover of the electronic device of FIG. 5A is opened according to various embodiments of the disclosure.

The electronic device 500 of FIGS. 5A to 5C may be at least partially similar to the electronic device 100 of FIG. 1A to 1D, or may include other embodiments of the electronic device.

Referring to FIG. 5A, the electronic device 500 may include a housing 510 and a cover 520 disposed to be openable/closable in the housing 510. According to one embodiment, at least one recess (e.g., the recess 1122 of FIG. 1A) configured to accommodate an external electronic device (e.g., the external electronic device 200 of FIG. 1D) disposed in the housing 510, and the hinge portion (e.g., the hinge portion 140 in FIG. 1A) have been omitted for the convenience of explanation, and the arrangement structure of a plurality of magnets M1 to M11 will be mainly described.

According to various embodiments, the cover 520 may include a first magnet M1 disposed in a first peripheral portion 5224 in the vicinity of the hinge portion, tenth and eleventh magnets M10 and M11 disposed at left and right sides with respect to the magnet M1, a third magnet M3 disposed in a second peripheral portion 5225 to be opposite the first peripheral portion 5224, and sixth and seventh magnets M6 and M7, which are disposed along the rim of the cover 520 around the third magnet M3 with the third magnet M3 being interposed therebetween. According to one embodiment, the housing 510 may include a second magnet M2 disposed in the first portion 5124 in the vicinity of the hinge portion corresponding to the first peripheral portion 5224 and reacting to the magnetic force of the first magnet M1, a fourth magnet M4 or a fifth magnet M5 disposed in the second portion 5125 opposite the first portion 5124 to be shifted by a predetermined distance by pressing the button 532, and eighth and ninth magnets M8 and M9 that are disposed at positions where the eighth and ninth magnets M8 and M9 react to the magnetic forces of the sixth and sixth magnets M6 and M7 in the rim of the housing 510 with the fourth magnet M4 and the fifth magnet M5 being interposed therebetween.

According to various embodiments, the first magnet M1 and the second magnet M2 may be disposed such that when the first magnet M1 and the second magnet M2 correspond to each other, a repulsive force is generated. According to one embodiment, the tenth magnet M10 and the eleventh magnet M11 may be disposed so as to generate an attractive force by reacting to the second magnet M2 in the state in which the cover 520 is closed. According to one embodiment, the third magnet M3 may be disposed such that an attractive force is generated between the third magnet M3 and the fourth magnet M4 at a position where the third magnet corresponds to the fourth magnet M4 when the button 532 is not pressed. According to one embodiment, the third magnet M3 may be disposed such that a repulsive force is generated between the third magnet M3 and the fifth magnet M5 at a position where the third magnet corresponds to the fifth magnet M5 when the button 532 is pressed. According to one embodiment, the sixth magnet M6 and the seventh magnet M7 may be disposed such that an attractive force is generated when the sixth magnet M6 and the seventh magnet M7 correspond to the eighth magnet M8 and the ninth magnet M9, respectively.

Referring to 5B, in the state in which the cover 520 is closed to the housing 510, the fourth magnet M4 and the third magnet M3 may mutually react to a magnetic force so as to maintain an attractive force therebetween. According to one embodiment, the sixth magnet M6 and the seventh magnet M7 may be disposed such that an attractive force acts between the sixth magnet M6 and the eighth magnet M8 and between the seventh magnet M7 and the ninth magnet M9. According to one embodiment, a tenth magnet M10 and an eleventh magnet M11 may be disposed in close proximity with the second magnet M2 so that an attractive force acts therebetween, so that a repulsive force continuously acting between the first magnet M1 and the second magnet M2 in the hinge portion can be reduced. For example, even if the first magnet M1 and the second magnet M2 are disposed at positions where a repulsive force is generated, the cover 520 can be maintained in the closed state in the housing 510 by the attractive force between the sixth magnet M6 and the eighth magnet M8, the attractive force between the seventh magnet M7 and the ninth magnet M9, and the attractive force between the tenth and eleventh magnets M10 and M11 and the second magnet M2. According to an embodiment, when the cover 520 is opened, the tenth and eleventh magnets M10 and M11 are moved away from the second magnet M2, so that the attraction force therebetween can be reduced.

Referring to FIG. 5C, the fourth and fifth magnets M4 and M5, which are disposed on the button bracket 531, may be moved by pressing the button 532 for the purpose of opening the cover 520 from the housing 510. According to one embodiment, according to the movement of the button bracket 531, the fourth magnet M4 deviates from the influence of the magnetic force of the third magnet M3 and the fifth magnet M5 corresponds to the third magnet M3, so that mutual repulsive force can be generated. For example, when the repulsive force between the fifth magnet M5 and the third magnet M3 is set to be greater than the attractive force between the sixth magnet M6 and the eighth magnet M8, and the attractive force between the seventh magnet M7 and the ninth magnet M9, the cover 520 can be opened. According to one embodiment, the cover 520 can be opened by a specified amount by being supported by the repulsive force between the first magnet M1 and the second magnet M2.

Figure 6A:
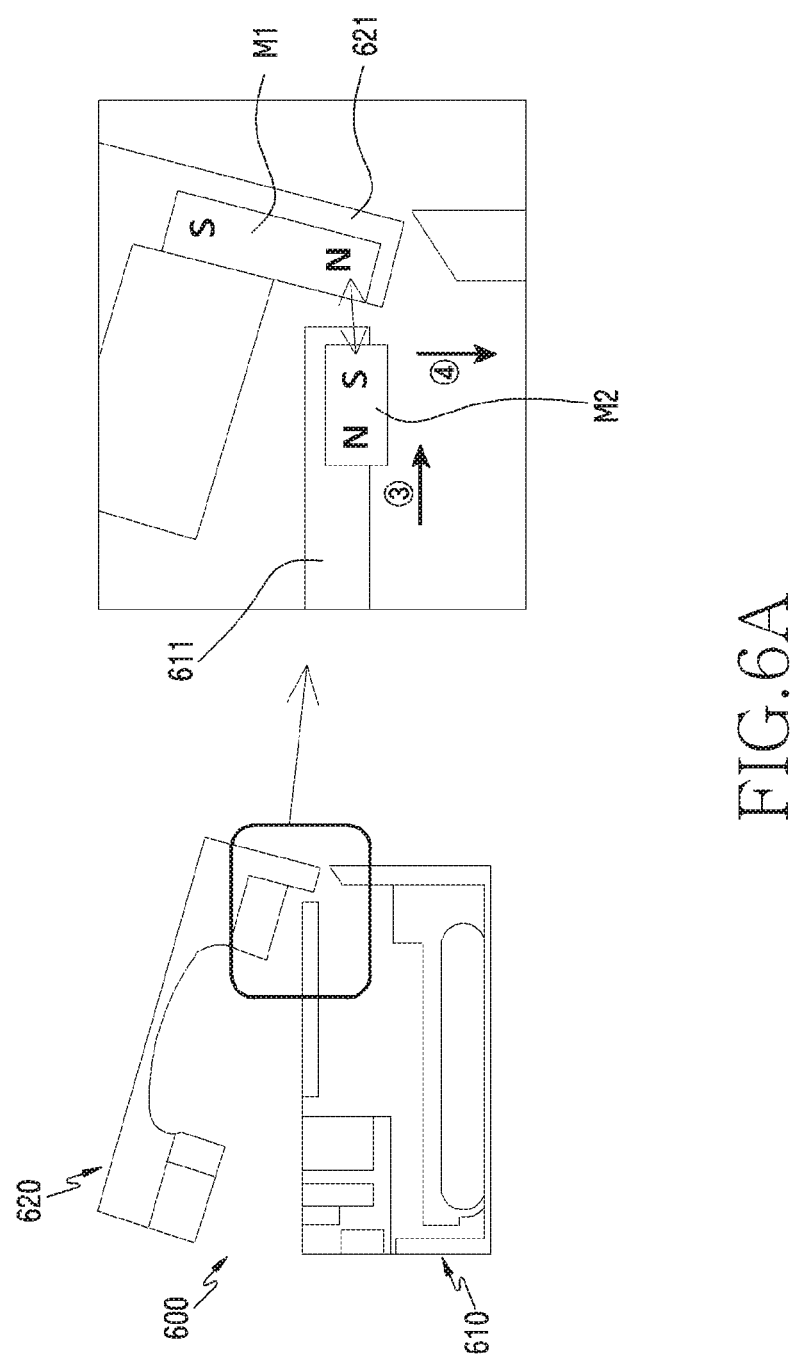
FIGS. 6A and 6B are views illustrating an arrangement relationship of magnets for opening the cover of the case device according to various embodiments of the disclosure.
Figure 6B:
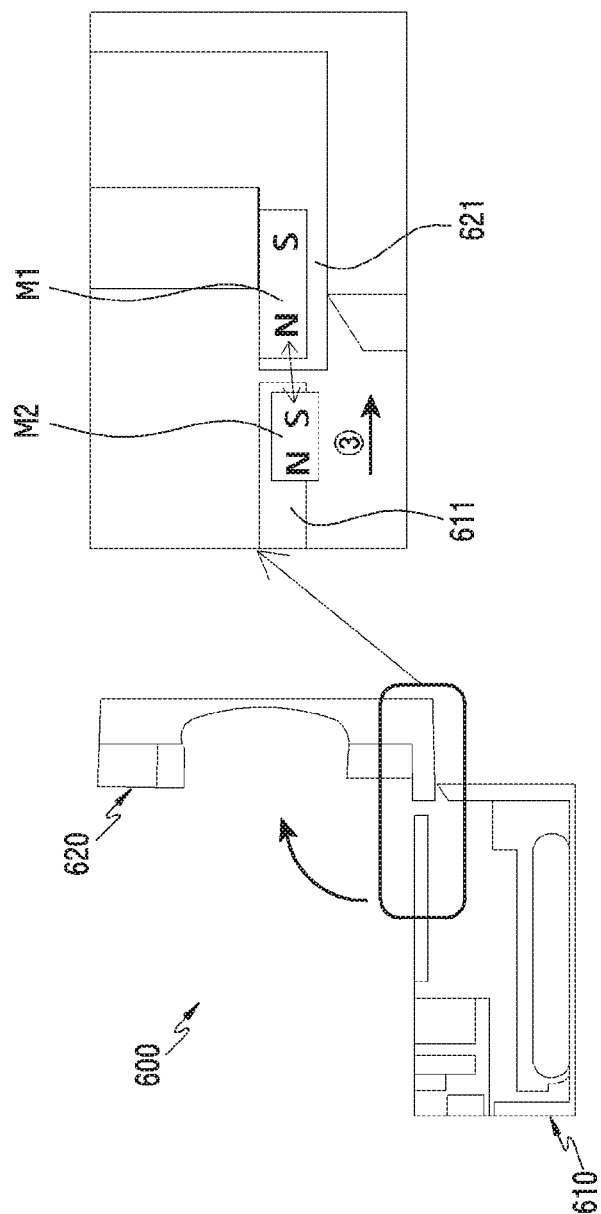

FIGS. 6A and 6B are views illustrating an arrangement relationship of magnets for opening the cover of the electronic device according to various embodiments of the disclosure.

The electronic device 600 of FIGS. 6A and 6B may be at least partially similar to the electronic device 100 of FIG. 1A to 1D, or may include other embodiments of the electronic device.

Referring to FIG. 6A, the electronic device 600 may include a housing 610 and a cover 620 disposed to be openable/closable in the housing 610. According to one embodiment, at least one recess (e.g., the recess 1122 of FIG. 1A) configured to accommodate an external electronic device (e.g., the external electronic device 200 of FIG. 1D) disposed in the housing 610, and the hinge portion (e.g., the hinge portion 140 in FIG. 1A) have been omitted for the convenience of explanation, and the arrangement structure of a plurality of magnets M1 and M2, which provides a force to open the cover, will be mainly described.

According to various embodiments, the second magnet M2 may be disposed along the upper face of the housing 610. According to one embodiment, the second magnet M2 may be disposed such that a magnetic force can be generated in a direction parallel to the upper face 611 (e.g., in the direction ③). According to one embodiment, in the cover 620, the first magnet M1 may be disposed through the hinge portion 621. According to one embodiment, in the state in which the cover 620 is closed, the first magnet M1 may generate a magnetic force in a direction parallel to the hinge portion (e.g., in the direction ④). For example, in the state in which the cover 620 is closed to the housing 610, the magnetic force direction of the first magnet M1 and the magnetic force direction of the second magnet M2 may be arranged such that the magnetic forces act in directions perpendicular to each other.

Referring to FIG. 6B, as the cover 620 is opened, the first magnet M1 of the cover 620 may be moved in such a manner that the direction of the magnetic force of the first magnet M1 coincides with the direction of the magnetic force of the second magnet M2. For example, as the cover 620 is opened, the attractive force between the second magnet M2 and the first magnet M1 gradually increases, whereby the cover 620 can be opened to a predetermined angle by the gradually increasing attractive force between the first magnet M1 and the second magnet M2.

Although not illustrated, the arrangement structure between two magnets (the two magnets M1 and M2 in FIG. 3A) using the repulsive force to open the cover (e.g., the cover 120 in FIG. 3A) of FIGS. 1A to 3D may be replaced by the arrangement structure between two magnets (e.g., the two magnets M1 and M2 in FIG. 6A) using an attractive force that gradually increases as the cover 620 is opened as described above.

Figure 7A:
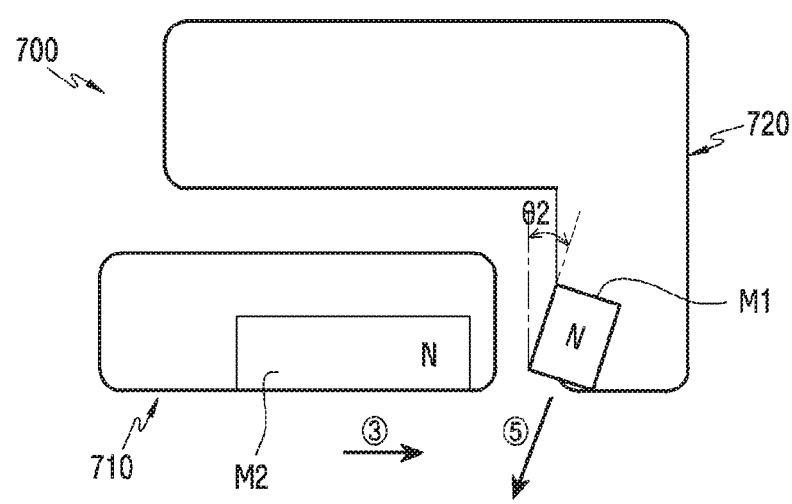
FIGS. 7A and 7B are views illustrating an arrangement relationship of magnets for opening the cover of the case device according to various embodiments of the disclosure.
Figure 7B:
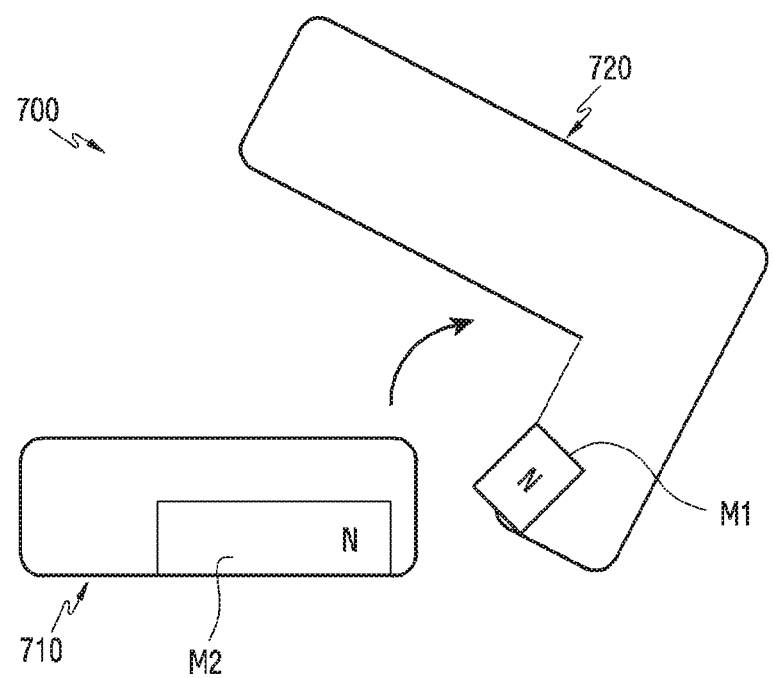

FIGS. 7A and 7B are views illustrating an arrangement relationship of magnets for opening the cover of the electronic device according to various embodiments of the disclosure.

The electronic device 700 of FIGS. 7A and 7B may be at least partially similar to the electronic device of FIG. 1A to 1D, or it may include other embodiments of the electronic device.

Referring to FIGS. 7A and 7B, according to various embodiments, the second magnet M2 may be disposed in the housing 710. According to one embodiment, the second magnet M2 may be disposed such that a magnetic force can be generated in a direction parallel to the upper face (e.g., in the direction ③). According to one embodiment, in the cover 720, the first magnet M1 may be disposed through the hinge portion. According to one embodiment, in the state in which the cover 720 is closed, the first magnet M1 may be disposed in a direction inclined at a certain angle θ2 (e.g., in the direction ⑤) with respect to an axis perpendicular to the direction ③ such that the magnetic force is directed to the second magnet M2. For example, the first magnet M1 may be disposed such that, in the state in which the cover 720 is closed to the housing 710, the magnetic force of the first magnet M1 may act in a direction inclined at a predetermined angle toward the second magnet M2.

According to various embodiments, as the cover 720 is opened from the housing 710, the first magnet M1 of the cover 720 may be moved in such a manner that the direction of the magnetic force of the first magnet M1 coincides with the direction of the magnetic force of the second magnet M2. For example, as the cover 720 is opened, the repulsive force between the second magnet M2 and the first magnet M1 gradually increases, whereby the cover 720 can be opened to a predetermined angle by the gradually increasing repulsive force between the first magnet M1 and the second magnet M2.

Although not illustrated, the arrangement structure between two magnets (the two magnets M1 and M2 in FIG. 3A) using the repulsive force to open the cover (e.g., the cover 120 in FIG. 3A) of FIGS. 1A to 3D may have the arrangement structure in which the first magnet M1 is disposed to be inclined at a predetermined angle with respect to the second magnet M2 as described above, and may be replaced by the arrangement structure between two magnets (e.g., the two magnets M1 and M2 in FIG. 7A) using a repulsive force that gradually increases as the cover 620 is opened as described above.

An electronic device (e.g., a case device) according to various embodiments of the disclosure has one or more magnets disposed at designated positions, so that it is possible to easily and reliably perform an opening/closing operation of a cover using the attractive and repulsive forces of the magnets, and it is possible to operate the electronic device by one hand, thereby improving convenience of use.

According to various embodiments, it is possible to provide an electronic device (e.g., the electronic device 100 of FIG. 1A) including: a housing (e.g., the housing 110 of FIG. 1A) including an upper face (e.g., the upper face 1121 of FIG. 1A) and at least one recess (e.g., the recess 1122 of FIG. 1A) formed through the upper face in order to accommodate at least one earphone device (e.g., the electronic device 200 in the form of an earphone shown in FIG. 1D); a cover (e.g., the cover 120 of FIG. 1A) configured to cover the at least one recess in a closed state and to allow access to the at least one recess in an opened state, the cover including a first peripheral portion (e.g., the first peripheral portion 1224 of FIG. 1A) that is connected to a first portion (e.g., the first portion 1124 of FIG. 1A) of the housing at one side with respect to the recess and a second peripheral portion (e.g., the second peripheral portion 1225 of FIG. 1A) that is separably connected to a second portion (e.g., the second portion 1125 of FIG. 1A) of the housing at the other side opposite the one side with respect the recess; at least one conductive pin (e.g., conductive pin 1123 of FIG. 1A) disposed in the recess, and biased mechanically toward the cover in the closed state; a circuit (e.g., the substrate assembly of FIG. 2A) electrically connected to the at least one conductive pin; a first magnet M1 (e.g., the first magnet M1 in FIG. 3A) disposed in the first peripheral portion of the cover and having a polarity; a second magnet M2 (e.g., the second magnet M2 in FIG. 3A) having a polarity which is the same as the first magnet, which is disposed in the housing to face the first magnet in the closed state; a third magnet M3 (e.g., the third magnet M3 in FIG. 3A) disposed in the second peripheral portion of the cover and having a polarity; a fourth magnet M4 (e.g., the fourth magnet M4 in FIG. 3A) disposed in the second peripheral portion near the third magnet and having a polarity opposite that of the third magnet; a fifth magnet M5 (e.g., the fifth magnet in FIG. 3A)

movably disposed in the housing to face the third magnet in the closed state and having a polarity opposite that of the third magnet; a mechanical hook structure (e.g., the hook structure 150 of FIG. 3A) coupled to the second peripheral portion of the cover in the closed state; and a button (e.g., the button 132 in FIG. 3A) configured to, when pressed, move the fifth magnet to a position facing the fourth magnet, thereby separating the hook structure from the second peripheral portion.

According to various embodiments, the electronic device may further include an earphone device (e.g., the electronic device 200 in the form of an earphone device shown in FIG. 1D), and the earphone device may include an electrical connector (e.g., the at least one electrical connector 221 of FIG. 1D) configured to come into contact with the at least one conductive pin and to press the conductive pin when the earphone device is inserted into the recess.

According to various embodiments, the earphone device may be at least partially powered off when inserted into the recess and may be configured to receive a signal from the circuit through the at least one conductive pin.

According to various embodiments, the electronic device may further include a hinge structure (e.g., the hinge structure 140 of FIG. 3A) configured to connect the first peripheral portion to the first portion of the housing.

According to various embodiments, it is possible to provide a case device (e.g., the case device or electronic device 100 of FIG. 1A) including: a housing (e.g., the housing 110 of FIG. 1A) including at least one recess (e.g., the recess 1122 of FIG. 1A) formed through an upper face so as to accommodate at least one external electronic device (e.g., the external electronic device 200 of FIG. 1D); a cover (e.g., the cover 120 of FIG. 1A) hinged by a hinge portion (e.g., the hinge portion 140 of FIG. 1A) to be capable of being opened/closed in a portion of the housing, and configured to cover the at least one recess in the closed state, the cover including a first peripheral portion (e.g., the first peripheral portion 1224 of FIG. 1A) opposite a first portion (e.g., the first portion 1124 of FIG. 1A) near the hinge portion with respect to the recess and a second peripheral portion (e.g., the second peripheral portion 1225 of FIG. 1A) separably connected to a second portion of the housing (e.g., the second portion 1125 of FIG. 1A) at the other side opposite the hinge portion; a first magnet M1 (e.g., the cover M1 in FIG. 3A) disposed on a first periphery of the cover, a second magnet M2 (e.g., the second magnet M2 in FIG. 3A) disposed in the housing and disposed to react to a magnetic force of the first magnet when the cover is closed; a third magnet M3 (e.g., the third magnet M3 in FIG. 3A) disposed in the second peripheral portion of the cover; a fourth magnet M4 (e.g., the fourth magnet M4 in FIG. 3A) disposed near the third magnet in the second peripheral portion; and a fifth magnet M5 (e.g., the fifth magnet M5 in FIG. 3A) movably disposed in the housing, and configured to hold the cover in a state of being closed to the housing when disposed so as to generate an attractive force at a position where the fifth magnet M5 reacts to the magnetic force of the third magnet, and configured to open the cover from the housing when shifted to a position where the fifth magnet M5 reacts to the magnetic force of the fourth magnet and disposed to generate a repulsive force.

According to various embodiments, the case device may further include a button assembly (e.g., the button assembly 130 in FIG. 2C) that is at least partially exposed from the housing to be capable of being pressed and is configured to, upon being pressed, move the fifth magnet from a position where the fifth magnet reacts to the third magnet to a position where the fifth magnet reacts to the fourth magnet.

According to various embodiments, the button assembly may include: a button bracket (e.g., the button bracket 131 in FIG. 2C) including a fifth magnet movably disposed in the housing; a button (e.g., the button 132 in FIG. 2C) disposed to move with the button bracket and at least partially exposed to be capable of being pressed on an outer face of the housing; and at least one elastic member (e.g., the elastic member 133 in FIG. 2C) configured to return the button and the button bracket to an original state thereof after the button and the button bracket are pressed.

According to various embodiments, the case device may further include: a hook structure (e.g., the hook structure 150 of FIG. 3A) configured to assist the closed state of the cover by an attractive force between the third magnet and the fifth magnet when the cover is closed.

According to various embodiments, the hook structure may include: a protrusion latching groove (e.g., the protrusion latching groove 1311 in FIG. 2C) formed in the button bracket, and a latching protrusion (e.g., the latching protrusion 1226 in FIG. 1A) protruding from the second peripheral portion of the cover toward the housing and disposed to be latched to the protrusion latching groove through the housing when the cover is closed.

According to various embodiments, when the button is pressed, the latching protrusion may be released from the protrusion latching groove.

According to various embodiments, when the button is pressed, the fifth magnet may be moved to a position where it reacts with a magnetic force of the fourth magnet.

According to various embodiments, the cover may be partially opened by the repulsive reaction of the fifth magnet with the fourth magnet, and the cover may be completely opened continuously by the magnetic force reaction between the first magnet and the second magnet.

According to various embodiments, the first magnet and the second magnet may be disposed to generate a repulsive force therebetween when the cover is closed.

According to various embodiments, the first magnet and the second magnet do not react with each other when the cover is closed and may be disposed such that the attractive force is gradually generated in a direction in which the cover is opened when the cover is opened.

According to various embodiments, the first magnet and the second magnet may be disposed such that, when the cover is closed, magnetic forces are generated in directions perpendicular to each other.

According to various embodiments, the first magnet and the second magnet may be disposed so that they do not react with each other when the cover is closed and a repulsive force is gradually generated in a direction in which the cover is opened when the cover is opened.

According to various embodiments, the first magnet may be disposed to generate a magnetic force in a direction inclined at a predetermined angle (e.g., the predetermined angle θ2 in FIG. 7A) with respect to a magnetic force generating direction of the second magnet.

According to various embodiments, the case device may further include: at least one sixth magnet (e.g., the fifth magnet M5 and/or the sixth magnet M6 of FIG. 4A) disposed near the second peripheral portion of the cover, and at least one seventh magnet (e.g., the seventh magnet M7 and/or an eighth magnet M8 in FIG. 4A) disposed at a position corresponding to the sixth magnet of the housing so as to support maintaining of the closed state of the cover by an attractive force with the sixth magnet.

According to various embodiments, the external electronic device may include a wired or a wireless earphone device (e.g., the electronic device 200 in the form of an earphone device shown in FIG. 1D) accommodated in the recess for the purpose of charging and/or data communication to a conductive pin included in the at least one recess.

According to various embodiments, the case device may include a portable charging cradle (not shown) configured to charge the electronic device 200 in the form of a wireless earphone device. The portable charging cradle may wirelessly charge the wireless earphone device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a housing including an upper face and at least one recess formed through the upper face in order to accommodate at least one earphone device;
 a cover configured to cover the at least one recess in a closed state and to allow access to the at least one recess in an opened state, the cover including a first peripheral portion that is connected to a first portion of the housing at one side with respect to the at least one recess and a second peripheral portion that is separably connected to a second portion of the housing at the other side opposite the one side with respect to the at least one recess;
 at least one conductive pin disposed in the at least one recess, and biased mechanically toward the cover in the closed state;
 a circuit electrically connected to the at least one conductive pin;
 a first magnet disposed in the first peripheral portion of the cover and having a first polarity;
 a second magnet disposed in the housing to face the first magnet in the closed state and having a second polarity which is the same as the first polarity;
 a third magnet disposed in the second peripheral portion of the cover and having a third polarity;
 a fourth magnet disposed in the second peripheral portion near the third magnet and having a fourth polarity opposite that of the third polarity;
 a fifth magnet movably disposed in the housing to face the third magnet in the closed state and having a fifth polarity opposite that of the third polarity;
 a mechanical hook structure coupled to the second peripheral portion of the cover in the closed state; and
 a button configured to, when pressed, separate the hook structure from the second peripheral portion while moving the fifth magnet to a position where the fifth magnet faces the fourth magnet.

2. The electronic device of claim 1, further comprising:
 an earphone device,
 wherein the earphone device includes an electric connector configured to make contact with the at least one conductive pin, and pushing the at least one conductive pin when the earphone device is inserted into the at least one recess.

3. The electronic device of claim 2,
 wherein the earphone device is at least partially powered off when inserted into the at least one recess, and
 wherein the earphone is configured to receive a signal from the circuit through the at least one conductive pin.

4. The electronic device of claim 1, further comprising:
 a hinge structure configured to connect the first peripheral portion to the first portion of the housing.

5. A case device comprising:
 a housing including at least one recess formed through an upper face so as to accommodate at least one external electronic device;
 a cover hinged by a hinge portion for opening and closing the cover in a portion of the housing, and configured to cover the at least one recess in a closed state, the cover including a first peripheral portion opposite a first portion of the housing near the hinge portion with respect to the at least one recess and a second peripheral portion separably connected to a second portion of the housing at another side opposite the hinge portion;
 a first magnet disposed on a first periphery of the cover;
 a second magnet disposed in the housing and disposed to react to a magnetic force of the first magnet in a state where the cover is closed;
 a third magnet disposed in the second peripheral portion of the cover;
 a fourth magnet disposed near the third magnet in the second peripheral portion;
 a fifth magnet movably disposed in the housing;
 a hook structure coupled to the second peripheral portion of the cover in the closed state,
 wherein the fifth magnet holds the cover in a state of being closed to the housing when disposed so as to generate an attractive force at a position where the fifth magnet reacts to a magnetic force of the third magnet, and opens the cover from the housing when shifted to a position where the fifth magnet reacts to the magnetic force of the fourth magnet and generates a repulsive force, and
 wherein the hook structure is configured to assist the closed state of the cover by the attractive force between the third magnet and the fifth magnet when the cover is closed; and
 a button assembly that is at least partially exposed from the housing to be capable of being pressed and, upon being pressed, the button assembly moves the fifth magnet from a position where the fifth magnet reacts to the third magnet to a position where the fifth magnet reacts to the fourth magnet,
 wherein the button assembly includes:
  a button bracket including the fifth magnet movably disposed in the housing,
  a button disposed to move with the button bracket and at least partially exposed to be capable of being pressed on an outer face of the housing, and
  at least one elastic member configured to return the button and the button bracket to an original state thereof after the button and the button bracket are pressed.

6. The case device of claim 5,
 wherein the hook structure includes: a protrusion latching groove formed in the button bracket; and
 a latching protrusion protruding from the second peripheral portion of the cover toward the housing and disposed to be latched to the protrusion latching groove through the housing when the cover is closed.

7. The case device of claim 6, wherein, when the button is pressed, the latching protrusion is released from the protrusion latching groove.

8. The case device of claim 5, wherein, when the button is pressed, the fifth magnet is moved to a position where the fifth magnet reacts with a magnetic force of the fourth magnet.

9. The case device of claim 5,
wherein the cover is partially opened by the repulsive force of the fifth magnet with the fourth magnet, and
wherein the cover is completely opened continuously by a reaction of the magnetic force between the first magnet and the second magnet.

10. The case device of claim 9, wherein the first magnet and the second magnet generate the repulsive force therebetween when the cover is closed.

11. The case device of claim 9, wherein the first magnet and the second magnet do not react with each other when the cover is closed and are disposed such that the attractive force is gradually generated in a direction in which the cover is opened when the cover is opened.

12. The case device of claim 11, wherein the first magnet and the second magnet are disposed such that, when the cover is closed, magnetic forces are generated in directions perpendicular to each other.

13. The case device of claim 9, wherein the first magnet and the second magnet do not react with each other when the cover is closed and are disposed such that the repulsive force is gradually generated in a direction in which the cover is opened when the cover is opened.

14. The case device of claim 13, wherein the first magnet is disposed to generate a magnetic force in a direction inclined at a predetermined angle with respect to a magnetic force generating direction of the second magnet.

15. The case device of claim 5, further comprising:
at least one sixth magnet disposed near the second peripheral portion of the cover; and
at least one seventh magnet disposed at a position corresponding to the sixth magnet of the housing to support maintaining of the closed state of the cover by an attractive force with the sixth magnet.

16. The case device of claim 5, wherein the external electronic device includes a wireless earphone device accommodated in the at least one recess for connecting to a conductive pin included in the at least one recess for charging the external electronic device and/or data communication.

17. The case device of claim 16, further comprising:
a portable charging cradle configured to charge the wireless earphone device.

* * * * *